United States Patent
Ferguson et al.

(10) Patent No.: US 8,204,860 B1
(45) Date of Patent: Jun. 19, 2012

(54) METHODS AND SYSTEMS FOR SNAPSHOT RECONSTITUTION

(75) Inventors: JC Ferguson, Harvard, MA (US);
Bradley E. Cain, Groton, MA (US);
Robert Cole, Hopkinton, MA (US)

(73) Assignee: F5 Networks, Inc., Seattle, WA (US)

( * ) Notice: Subject to any disclaimer, the term of this patent is extended or adjusted under 35 U.S.C. 154(b) by 314 days.

(21) Appl. No.: 12/702,849

(22) Filed: Feb. 9, 2010

(51) Int. Cl.
*G06F 7/10* (2006.01)
*G06F 17/30* (2006.01)

(52) U.S. Cl. ........ 707/639; 707/649; 707/652; 707/657; 711/161; 711/162

(58) Field of Classification Search ........... 707/999.102, 707/999.202, 999.204, 639, 649, 652, 657; 711/161, 162
See application file for complete search history.

(56) References Cited

U.S. PATENT DOCUMENTS

| | | | |
|---|---|---|---|
| 4,993,030 A | 2/1991 | Krakauer et al. | |
| 5,218,695 A | 6/1993 | Noveck et al. | |
| 5,303,368 A | 4/1994 | Kotaki | |
| 5,473,362 A | 12/1995 | Fitzgerald et al. | |
| 5,511,177 A | 4/1996 | Kagimasa et al. | |
| 5,537,585 A | 7/1996 | Blickenstaff et al. | |
| 5,548,724 A | 8/1996 | Akizawa et al. | |
| 5,550,965 A | 8/1996 | Gabbe et al. | |
| 5,583,995 A | 12/1996 | Gardner et al. | |
| 5,586,260 A | 12/1996 | Hu | |
| 5,590,320 A | 12/1996 | Maxey | |
| 5,649,194 A | 7/1997 | Miller et al. | |
| 5,649,200 A | 7/1997 | Leblang et al. | |
| 5,668,943 A | 9/1997 | Attanasio et al. | |
| 5,692,180 A | 11/1997 | Lee | |
| 5,721,779 A | 2/1998 | Funk | |
| 5,724,512 A | 3/1998 | Winterbottom | |
| 5,806,061 A | 9/1998 | Chaudhuri et al. | |
| 5,832,496 A | 11/1998 | Anand et al. | |

(Continued)

FOREIGN PATENT DOCUMENTS

AU 2003300350 A1 7/2004

(Continued)

OTHER PUBLICATIONS

"The AFS File System in Distributed Computing Environment," www.transarc.ibm.com/Library/whitepapers/AFS/afsoverview.html, last accessed on Dec. 20, 2002.

(Continued)

*Primary Examiner* — James Trujillo
*Assistant Examiner* — Bruce Moser
(74) *Attorney, Agent, or Firm* — LeClairRyan, a Professional Corporation

(57) ABSTRACT

A method, computer readable medium, and a system for reconstituting a virtual snapshot of files in a file virtualization system includes forming at a file virtualization device a virtual snapshot that includes a plurality of physical snapshots associated with one or more file storage devices participating in the virtual snapshot, receiving a request for performing an operation on one or more physical snapshots in the plurality of physical snapshots, providing the one or more physical snapshots in response to the request for performing the operation when the one or more physical snapshots exists in the virtual snapshot, and reconstituting the virtual snapshot by including the one or more physical snapshots to form a reconstituted virtual snapshot in response to the request for performing the operation when the one or more physical snapshots do not exist in the virtual snapshot.

24 Claims, 5 Drawing Sheets

U.S. PATENT DOCUMENTS

| | | | |
|---|---|---|---|
| 5,832,522 A | 11/1998 | Blickenstaff et al. |
| 5,838,970 A | 11/1998 | Thomas |
| 5,862,325 A | 1/1999 | Reed et al. |
| 5,884,303 A | 3/1999 | Brown |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,920,873 A | 7/1999 | Van Huben et al. |
| 5,937,406 A | 8/1999 | Balabine et al. |
| 5,999,664 A | 12/1999 | Mahoney et al. |
| 6,012,083 A | 1/2000 | Savitzky et al. |
| 6,029,168 A | 2/2000 | Frey |
| 6,044,367 A | 3/2000 | Wolff |
| 6,047,129 A | 4/2000 | Frye |
| 6,072,942 A | 6/2000 | Stockwell et al. |
| 6,078,929 A | 6/2000 | Rao |
| 6,085,234 A | 7/2000 | Pitts et al. |
| 6,088,694 A | 7/2000 | Burns et al. |
| 6,128,627 A | 10/2000 | Mattis et al. |
| 6,128,717 A | 10/2000 | Harrison et al. |
| 6,161,145 A | 12/2000 | Bainbridge et al. |
| 6,161,185 A | 12/2000 | Guthrie et al. |
| 6,181,336 B1 | 1/2001 | Chiu et al. |
| 6,223,206 B1 | 4/2001 | Dan et al. |
| 6,233,648 B1 | 5/2001 | Tomita |
| 6,237,008 B1 | 5/2001 | Beal et al. |
| 6,256,031 B1 | 7/2001 | Meijer et al. |
| 6,282,610 B1 | 8/2001 | Bergsten |
| 6,289,345 B1 | 9/2001 | Yasue |
| 6,308,162 B1 | 10/2001 | Ouimet et al. |
| 6,324,581 B1 | 11/2001 | Xu et al. |
| 6,339,785 B1 | 1/2002 | Feigenbaum |
| 6,349,343 B1 | 2/2002 | Foody et al. |
| 6,374,263 B1 | 4/2002 | Bunger et al. |
| 6,389,433 B1 | 5/2002 | Bolosky et al. |
| 6,393,581 B1 | 5/2002 | Friedman et al. |
| 6,397,246 B1 | 5/2002 | Wolfe |
| 6,412,004 B1 | 6/2002 | Chen et al. |
| 6,438,595 B1 | 8/2002 | Blumenau et al. |
| 6,477,544 B1 | 11/2002 | Bolosky et al. |
| 6,487,561 B1 | 11/2002 | Ofek et al. |
| 6,493,804 B1 | 12/2002 | Soltis et al. |
| 6,516,350 B1 | 2/2003 | Lumelsky et al. |
| 6,516,351 B2 | 2/2003 | Borr |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,601,101 B1 | 7/2003 | Lee et al. |
| 6,612,490 B1 | 9/2003 | Herrendoerfer et al. |
| 6,721,794 B2 | 4/2004 | Taylor et al. |
| 6,738,790 B1 | 5/2004 | Klein et al. |
| 6,742,035 B1 | 5/2004 | Zayas et al. |
| 6,748,420 B1 | 6/2004 | Quatrano et al. |
| 6,757,706 B1 | 6/2004 | Dong et al. |
| 6,775,673 B2 | 8/2004 | Mahalingam et al. |
| 6,775,679 B2 | 8/2004 | Gupta |
| 6,782,450 B2 | 8/2004 | Arnott et al. |
| 6,801,960 B1 | 10/2004 | Ericson et al. |
| 6,826,613 B1 | 11/2004 | Wang et al. |
| 6,839,761 B2 | 1/2005 | Kadyk et al. |
| 6,847,959 B1 | 1/2005 | Arrouye et al. |
| 6,847,970 B2 | 1/2005 | Keller et al. |
| 6,850,997 B1 | 2/2005 | Rooney et al. |
| 6,889,249 B2 | 5/2005 | Miloushev et al. |
| 6,922,688 B1 | 7/2005 | Frey, Jr. |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,959,373 B2 | 10/2005 | Testardi |
| 6,961,815 B2 | 11/2005 | Kistler et al. |
| 6,973,455 B1 | 12/2005 | Vahalia et al. |
| 6,973,549 B1 | 12/2005 | Testardi |
| 6,985,936 B2 | 1/2006 | Agarwalla et al. |
| 6,985,956 B2 | 1/2006 | Luke et al. |
| 6,986,015 B2 | 1/2006 | Testardi |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 7,010,553 B2 | 3/2006 | Chen et al. |
| 7,013,379 B1 | 3/2006 | Testardi |
| 7,051,112 B2 | 5/2006 | Dawson |
| 7,072,917 B2 | 7/2006 | Wong et al. |
| 7,089,286 B1 | 8/2006 | Malik |
| 7,111,115 B2 | 9/2006 | Peters et al. |
| 7,113,962 B1 | 9/2006 | Kee et al. |
| 7,120,746 B2 | 10/2006 | Campbell et al. |
| 7,127,556 B2 | 10/2006 | Blumenau et al. |
| 7,133,967 B2 | 11/2006 | Fujie et al. |
| 7,146,524 B2 | 12/2006 | Patel et al. |
| 7,152,184 B2 | 12/2006 | Maeda et al. |
| 7,155,466 B2 | 12/2006 | Rodriguez et al. |
| 7,165,095 B2 | 1/2007 | Sim |
| 7,167,821 B2 | 1/2007 | Hardwick et al. |
| 7,173,929 B1 | 2/2007 | Testardi |
| 7,194,579 B2 | 3/2007 | Robinson et al. |
| 7,234,074 B2 | 6/2007 | Cohn et al. |
| 7,280,536 B2 | 10/2007 | Testardi |
| 7,284,150 B2 | 10/2007 | Ma et al. |
| 7,293,097 B2 | 11/2007 | Borr |
| 7,293,099 B1 | 11/2007 | Kalajan |
| 7,293,133 B1 | 11/2007 | Colgrove et al. |
| 7,346,664 B2 | 3/2008 | Wong et al. |
| 7,383,288 B2 | 6/2008 | Miloushev et al. |
| 7,401,220 B2 | 7/2008 | Bolosky et al. |
| 7,406,484 B1 | 7/2008 | Srinivasan et al. |
| 7,415,488 B1 | 8/2008 | Muth et al. |
| 7,415,608 B2 | 8/2008 | Bolosky et al. |
| 7,437,603 B2 * | 10/2008 | Ebata et al. .................... 714/6.1 |
| 7,440,982 B2 | 10/2008 | Lu et al. |
| 7,475,241 B2 | 1/2009 | Patel et al. |
| 7,477,796 B2 | 1/2009 | Sasaki et al. |
| 7,509,322 B2 | 3/2009 | Miloushev et al. |
| 7,512,673 B2 | 3/2009 | Miloushev et al. |
| 7,519,813 B1 | 4/2009 | Cox et al. |
| 7,562,110 B2 | 7/2009 | Miloushev et al. |
| 7,571,168 B2 | 8/2009 | Bahar et al. |
| 7,574,433 B2 | 8/2009 | Engel |
| 7,599,941 B2 | 10/2009 | Bahar et al. |
| 7,610,307 B2 | 10/2009 | Havewala et al. |
| 7,624,109 B2 | 11/2009 | Testardi |
| 7,639,883 B2 | 12/2009 | Gill |
| 7,653,699 B1 | 1/2010 | Colgrove et al. |
| 7,657,717 B1 * | 2/2010 | Karr et al. .................... 711/162 |
| 7,734,603 B1 | 6/2010 | McManis |
| 7,788,335 B2 | 8/2010 | Miloushev et al. |
| 7,822,939 B1 | 10/2010 | Veprinsky et al. |
| 7,831,639 B1 | 11/2010 | Panchbudhe et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,913,053 B1 | 3/2011 | Newland |
| 7,958,347 B1 | 6/2011 | Ferguson |
| 8,005,953 B2 | 8/2011 | Miloushev et al. |
| 2001/0014891 A1 | 8/2001 | Hoffert et al. |
| 2001/0047293 A1 | 11/2001 | Waller et al. |
| 2001/0051955 A1 | 12/2001 | Wong |
| 2002/0035537 A1 | 3/2002 | Waller et al. |
| 2002/0059263 A1 | 5/2002 | Shima et al. |
| 2002/0065810 A1 | 5/2002 | Bradley |
| 2002/0073105 A1 | 6/2002 | Noguchi et al. |
| 2002/0083118 A1 | 6/2002 | Sim |
| 2002/0133330 A1 | 9/2002 | Loisey et al. |
| 2002/0133491 A1 | 9/2002 | Sim et al. |
| 2002/0147630 A1 | 10/2002 | Rose et al. |
| 2002/0150253 A1 | 10/2002 | Brezak et al. |
| 2002/0161911 A1 | 10/2002 | Pinckney, III et al. |
| 2002/0188667 A1 | 12/2002 | Kirnos |
| 2003/0009429 A1 | 1/2003 | Jameson |
| 2003/0028514 A1 | 2/2003 | Lord et al. |
| 2003/0033308 A1 | 2/2003 | Patel et al. |
| 2003/0033535 A1 | 2/2003 | Fisher et al. |
| 2003/0061240 A1 | 3/2003 | McCann et al. |
| 2003/0115218 A1 | 6/2003 | Bobbitt et al. |
| 2003/0115439 A1 | 6/2003 | Mahalingam et al. |
| 2003/0149781 A1 | 8/2003 | Yared et al. |

| | | |
|---|---|---|
| 2003/0159072 A1 | 8/2003 | Bellinger et al. |
| 2003/0171978 A1 | 9/2003 | Jenkins et al. |
| 2003/0177388 A1 | 9/2003 | Botz et al. |
| 2003/0204635 A1 | 10/2003 | Ko et al. |
| 2004/0003266 A1 | 1/2004 | Moshir et al. |
| 2004/0006575 A1 | 1/2004 | Visharam et al. |
| 2004/0010654 A1 | 1/2004 | Yasuda et al. |
| 2004/0025013 A1 | 2/2004 | Parker et al. |
| 2004/0028043 A1 | 2/2004 | Maveli et al. |
| 2004/0028063 A1 | 2/2004 | Roy et al. |
| 2004/0030857 A1 | 2/2004 | Krakirian et al. |
| 2004/0054777 A1 | 3/2004 | Ackaouy et al. |
| 2004/0093474 A1 | 5/2004 | Lin et al. |
| 2004/0098383 A1 | 5/2004 | Tabellion et al. |
| 2004/0133606 A1 | 7/2004 | Miloushev et al. |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0181605 A1 | 9/2004 | Nakatani et al. |
| 2004/0199547 A1 | 10/2004 | Winter et al. |
| 2004/0236798 A1 | 11/2004 | Srinivasan et al. |
| 2005/0021615 A1 | 1/2005 | Arnott et al. |
| 2005/0050107 A1 | 3/2005 | Mane et al. |
| 2005/0091214 A1 | 4/2005 | Probert et al. |
| 2005/0108575 A1 | 5/2005 | Yung |
| 2005/0114291 A1 | 5/2005 | Becker-Szendy et al. |
| 2005/0187866 A1 | 8/2005 | Lee |
| 2005/0246393 A1 | 11/2005 | Coates et al. |
| 2005/0289109 A1 | 12/2005 | Arrouye et al. |
| 2005/0289111 A1 | 12/2005 | Tribble et al. |
| 2006/0010502 A1 | 1/2006 | Mimatsu et al. |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0112151 A1 | 5/2006 | Manley et al. |
| 2006/0123062 A1 | 6/2006 | Bobbitt et al. |
| 2006/0167838 A1 | 7/2006 | Lacapra |
| 2006/0179261 A1 | 8/2006 | Rajan |
| 2006/0184589 A1 | 8/2006 | Lees et al. |
| 2006/0190496 A1 | 8/2006 | Tsunoda |
| 2006/0200470 A1 | 9/2006 | Lacapra et al. |
| 2006/0212746 A1 | 9/2006 | Amegadzie et al. |
| 2006/0224687 A1 | 10/2006 | Popkin et al. |
| 2006/0230265 A1 | 10/2006 | Krishna |
| 2006/0242179 A1 | 10/2006 | Chen et al. |
| 2006/0259949 A1 | 11/2006 | Schaefer et al. |
| 2006/0271598 A1 | 11/2006 | Wong et al. |
| 2006/0277225 A1 | 12/2006 | Mark et al. |
| 2006/0282461 A1 | 12/2006 | Marinescu |
| 2006/0282471 A1 | 12/2006 | Mark et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0088702 A1 | 4/2007 | Fridella et al. |
| 2007/0136308 A1 | 6/2007 | Tsirigotis et al. |
| 2007/0208748 A1 | 9/2007 | Li |
| 2007/0209075 A1 | 9/2007 | Coffman |
| 2007/0226331 A1 | 9/2007 | Srinivasan et al. |
| 2008/0046432 A1 | 2/2008 | Anderson et al. |
| 2008/0070575 A1 | 3/2008 | Claussen et al. |
| 2008/0104443 A1 | 5/2008 | Akutsu et al. |
| 2008/0208933 A1 | 8/2008 | Lyon |
| 2008/0209073 A1 | 8/2008 | Tang |
| 2008/0222223 A1 | 9/2008 | Srinivasan et al. |
| 2008/0243769 A1 | 10/2008 | Arbour et al. |
| 2008/0282047 A1 | 11/2008 | Arakawa et al. |
| 2009/0007162 A1 | 1/2009 | Sheehan |
| 2009/0037975 A1 | 2/2009 | Ishikawa et al. |
| 2009/0041230 A1 | 2/2009 | Williams |
| 2009/0055607 A1 | 2/2009 | Schack et al. |
| 2009/0077097 A1 | 3/2009 | Lacapra et al. |
| 2009/0089344 A1 | 4/2009 | Brown et al. |
| 2009/0094252 A1 | 4/2009 | Wong et al. |
| 2009/0106255 A1 | 4/2009 | Lacapra et al. |
| 2009/0106263 A1 | 4/2009 | Khalid et al. |
| 2009/0132616 A1 | 5/2009 | Winter et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0254592 A1 | 10/2009 | Marinov et al. |
| 2010/0077294 A1 | 3/2010 | Watson |
| 2010/0211547 A1 | 8/2010 | Kamei et al. |
| 2011/0087696 A1 | 4/2011 | Lacapra |

FOREIGN PATENT DOCUMENTS

| | | |
|---|---|---|
| CA | 2512312 A1 | 7/2004 |
| EP | 0 738 970 A1 | 10/1996 |
| JP | 63010250 A | 1/1988 |
| JP | 06-332782 | 12/1994 |
| JP | 08-328760 | 12/1996 |
| JP | 08-339355 | 12/1996 |
| JP | 9016510 A | 1/1997 |
| JP | 11282741 A | 10/1999 |
| WO | WO 02/056181 A2 | 7/2002 |
| WO | WO 2004/061605 A2 | 7/2004 |
| WO | WO 2008/130983 A1 | 10/2008 |
| WO | WO 2008/147973 A2 | 12/2008 |

OTHER PUBLICATIONS

Aguilera, Marcos K. et al., "Improving recoverability in multi-tier storage systems," International Conference on Dependable Systems and Networks (DSN-2007), Jun. 2007, 10 pages, Edinburgh, Scotland.

Anderson, Darrell C. et al., "Interposed Request Routing for Scalable Network Storage," ACM Transactions on Computer Systems 20(1): (Feb. 2002), pp. 1-24.

Anderson et al., "Serverless Network File System," in the 15th Symposium on Operating Systems Principles, Dec. 1995, Association for Computing Machinery, Inc.

Anonymous, "How DFS Works: Remote File Systems," Distributed File System (DFS) Technical Reference, retrieved from the Internet on Feb. 13, 2009: URL<:http://technetmicrosoft.com/en-us/library/cc782417WS.10,printer).aspx> (Mar. 2003).

Apple, Inc., "Mac OS X Tiger Keynote Intro. Part 2," Jun. 2004, www.youtube.com <http://www.youtube.com/watch?v=zSBJwEmRJbY>, p. 1.

Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spotlight.html>, pp. 1-6.

"A Storage Architecture Guide," Second Edition, 2001, Auspex Systems, Inc., www.auspex.com, last accessed on Dec. 30, 2002.

Basney et al., "Credential Wallets: A Classification of Credential Repositories Highlighting MyProxy," Sep. 19-21, 2003, pp. 1-20, 31$^{st}$ Research Conference on Communication, Information and Internet Policy (TPRC 2003), Arlington, Virginia.

Botzum, Keys, "Single Sign On—A Contrarian View," Aug. 6, 2001, pp. 1-8, Open Group Website, http://www.opengroup.org/security/topics.htm.

Cabrera et al., "Swift: A Storage Architecture for Large Objects," In Proceedings of the—Eleventh IEEE Symposium on Mass Storage Systems, Oct. 1991, pp. 123-128.

Cabrera et al., "Swift: Using Distributed Disk Striping to Provide High I/O Data Rates," Fall 1991, pp. 405-436, vol. 4, No. 4, Computing Systems.

Cabrera et al., "Using Data Striping in a Local Area Network," 1992, technical report No. UCSC-CRL-92-09 of the Computer & Information Sciences Department of University of California at Santa Cruz.

Callaghan et al., "NFS Version 3 Protocol Specifications" (RFC 1813), Jun. 1995, The Internet Engineering Task Force (IETN), www.ietf.org, last accessed on Dec. 30, 2002.

Carns et al., "PVFS: A Parallel File System for Linux Clusters," in Proceedings of the Extreme Linux Track: 4th Annual Linux Showcase and Conference, Oct. 2000, pp. 317-327, Atlanta, Georgia, USENIX Association.

Cavale, M. R., "Introducing Microsoft Cluster Service (MSCS) in the Windows Server 2003", Microsoft Corporation, Nov. 2002.

"CSA Persistent File System Technology," A White Paper, Jan. 1, 1999, p. 1-3, http://www.cosoa.com/white_papers/pfs.php, Colorado Software Architecture, Inc.

"Distributed File System: A Logical View of Physical Storage: White Paper," 1999, Microsoft Corp., www.microsoft.com, <http://www.eu.microsoft.com/TechNet/prodtechnol/windows2000serv/maintain/DFSnt95>, pp. 1-26, last accessed on Dec. 20, 2002.

English Translation of Notification of Reason(s) for Refusal for JP 2002-556371 (Dispatch Date: Jan. 22, 2007).

Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.

Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997.

Gibson et al., "NASD Scalable Storage Systems," Jun. 1999, USENIX99, Extreme Linux Workshop, Monterey, California.

Harrison, C., May 19, 2008 response to Communication pursuant to Article 96(2) EPC dated Nov. 9, 2007 in corresponding European patent application No. 02718824.2.

Hartman, J., "The Zebra Striped Network File System," 1994, Ph.D. dissertation submitted in the Graduate Division of the University of California at Berkeley.

Haskin et al., "The Tiger Shark File System," 1996, in proceedings of IEEE, Spring COMPCON, Santa Clara, CA, www.research.ibm.com, last accessed on Dec. 30, 2002.

Hu, J., Final Office action dated Sep. 21, 2007 for related U.S. Appl. No. 10/336,784.

Hu, J., Office action dated Feb. 6, 2007 for related U.S. Appl. No. 10/336,784.

Hwang et al., "Designing SSI Clusters with Hierarchical Checkpointing and Single 1/0 Space," IEEE Concurrency, Jan.-Mar. 1999, pp. 60-69.

International Search Report for International Patent Application No. PCT/US2008/083117 (Jun. 23, 2009).

International Search Report for International Patent Application No. PCT/US2008/060449 (Apr. 9, 2008).

International Search Report for International Patent Application No. PCT/US2008/064677 (Sep. 6, 2009).

International Search Report for International Patent Application No. PCT /US02/00720, Jul. 8, 2004.

International Search Report from International Application No. PCT/US03/41202, mailed Sep. 15, 2005.

Karamanolis, C. et al., "An Architecture for Scalable and Manageable File Services," HPL-2001-173, Jul. 26, 2001. p. 1-114.

Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.

Kimball, C.E. et al., "Automated Client-Side Integration of Distributed Application Servers," 13Th LISA Conf, 1999, pp. 275-282 of the Proceedings.

Klayman, J., Nov. 13, 2008 e-mail to Japanese associate including instructions for response to office action dated May 26, 2008 in corresponding Japanese patent application No. 2002-556371.

Klayman, J., Jul. 18, 2007 e-mail to Japanese associate including instructions for response to office action dated Jan. 22, 2007 in corresponding Japanese patent application No. 2002-556371.

Kohl et al., "The Kerberos Network Authentication Service (V5)," RFC 1510, Sep. 1993. (http://www.ietf.org/ rfc/rfc1510.txt?number=1510).

Korkuzas, V., Communication pursuant to Article 96(2) EPC dated Nov. 11, 2007 in corresponding European patent application No. 02718824.2-2201.

Lelil, S., "Storage Technology News: AutoVirt adds tool to help data migration projects," Feb. 25, 2011, last accessed Mar. 17, 2011, <http://searchstorage.techtarget.com/news/article/0,289142,sid5_gci1527986,00.html>.

Long et al., "Swift/RAID: A distributed RAID System", Computing Systems, Summer 1994, vol. 7, pp. 333-359.

"NERSC Tutorials: I/O on the Cray T3E, 'Chapter 8, Disk Striping'," National Energy Research Scientific Computing Center (NERSC), http://hpcfnersc.gov, last accessed on Dec. 27, 2002.

Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.

Norton et al., "CIFS Protocol Version CIFS-Spec 0.9," 2001, Storage Networking Industry Association (SNIA), www.snia.org, last accessed on Mar. 26, 2001.

Novotny et al., "An Online Credential Repository for the Grid: MyProxy," 2001, pp. 1-8.

Pashalidis et al., "A Taxonomy of Single Sign-On Systems," 2003, pp. 1-16, Royal Holloway, University of London, Egham Surray, TW20, 0EX, United Kingdom.

Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004.Royal Holloway, University of London.

Patterson et al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.

Pearson, P.K., "Fast Hashing of Variable-Length Text Strings," Comm of the ACM, Jun. 1990, pp. 1-4, vol. 33, No. 6.

Peterson, M., "Introducing Storage Area Networks," Feb. 1998, InfoStor, www.infostor.com, last accessed on Dec. 20, 2002.

Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org, last accessed on Dec. 20, 2002.

Response filed Jul. 6, 2007 to Office action dated Feb. 6, 2007 for related U.S. Appl. No. 10/336,784.

Response filed Mar. 20, 2008 to Final Office action dated Sep. 21,2007 for related U.S. Appl. No. 10/336,784.

Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0-7803-5880-5 p. 867, col. 2, last paragraph -p. 868, col. 1, paragraph 1.

RSYNC, "Welcome to the RSYNC Web Pages," Retrieved from the Internet URL: http://samba.anu.edu.ut.rsync/. (Retrieved on Dec. 18, 2009).

Savage, et al., "AFRAID—A Frequently Redundant Array of Independent Disks," Jan. 22-26, 1996, pp. 1-13, USENIX Technical Conference, San Diego, California.

"Scaling Next Generation Web Infrastructure with Content-Intelligent Switching: White Paper," Apr. 2000, p. 1-9 Alteon Web Systems, Inc.

Soltis et al., "The Design and Performance of a Shared Disk File System for IRIX," Mar. 23-26, 1998, pp. 1-17, Sixth NASA Goddard Space Flight Center Conference on Mass Storage and Technologies in cooperation with the Fifteenth IEEE Symposium on Mass Storage Systems, University of Minnesota.

Soltis et al., "The Global File System," Sep. 17-19, 1996, in Proceedings of the Fifth NASA Goddard Space Flight Center Conference on Mass Storage Systems and Technologies, College Park, Maryland.

Sorenson, K.M., "Installation and Administration: Kimberlite Cluster Version 1.1.0, Rev. Dec. 2000," Mission Critical Linux, http://oss.missioncriticallinux.corn/kimberlite/kimberlite.pdf.

Stakutis, C., "Benefits of SAN-based file system sharing," Jul. 2000, pp. 1-4, InfoStor, www.infostor.com, last accessed on Dec. 30, 2002.

Thekkath et al., "Frangipani: A Scalable Distributed File System," in Proceedings of the 16th ACM Symposium on Operating Systems Principles, Oct. 1997, pp. 1-14, Association for Computing Machinery, Inc.

Tulloch, Mitch, "Microsoft Encyclopedia of Security," 2003, pp. 218, 300-301, Microsoft Press, Redmond, Washington.

Uesugi, H., English translation of office action dated May 26, 2008 in corresponding Japanese patent application No. 2002-556371.

"VERITAS SANPoint Foundation Suite(tm) and SANPoint Foundation Suite(tm) HA: New VERITAS Volume Management and File System Technology for Cluster Environments," Sep. 2001, VERITAS Software Corp.

Wilkes, J., et al., "The HP AutoRAID Hierarchical Storage System," Feb. 1996, vol. 14, No. 1, ACM Transactions on Computer Systems.

"Windows Clustering Technologies—An Overview," Nov. 2001, Microsoft Corp., www.microsoft.com, last accessed on Dec. 30, 2002.

Zayas, E., "AFS-3 Programmer's Reference: Architectural Overview," Transarc Corp., version 1.0 of Sep. 2, 1991, doc. No. FS-00-D160.

* cited by examiner

METHODS AND SYSTEMS FOR SNAPSHOT RECONSTITUTION

TECHNOLOGICAL FIELD

This technology generally relates to file virtualization systems, and more particularly, to systems and methods for reconstituting virtual snapshots in a file virtualization environment.

BACKGROUND

In a file system environment, physical snapshots of the physical file system include a point-in-time state of the entire network accessible portion of the file system. Client computing devices in such a direct client-server environment can directly obtain the physical snapshots from the servers. Unlike non-virtualized file systems in which a network-accessible file resides on a single storage device accessible directly to client computing devices, in a virtualized file system, a network-accessible file system may exist on multiple storage devices, transparent to the client computing devices, and managed by a file virtualization device interposed between the client computing devices and the servers. In such virtualized file systems, a virtual snapshot that includes an aggregation of physical snapshots may exist on multiple physical storage devices, or, in some cases, on the same storage device but on different physical file systems. The aggregate of all the physical snapshots in a file virtualization device is required to provide the client computing devices with a complete view of the network-accessible file system. If one or more of the physical snapshots making up a virtual snapshot is missing, the client computing device does not get complete state of the file system via the snapshot. Generating such virtual snapshots and presenting them to requesting client computing devices is disclosed in U.S. patent application Ser. No. 12/334,281, filed Dec. 12, 2008, entitled "Methods for Generating a Unified Virtual Snapshot and Systems Thereof," which is hereby incorporated by reference in its entirety.

However, in conventional file virtualization systems, if the file virtualization device experiences a catastrophic failure and a complete reconfiguration is required, no technology exists that enables the file virtualization device to "re-learn" all the snapshots managed prior to the catastrophic failure. Further, the file virtualization device does not have knowledge of translating the physical snapshots into a coherent virtual snapshot after the failure.

In another scenario, if a customer deploying the file virtualization device elects to purchase newer, faster file virtualization device, existing snapshots are difficult to be transferred to the new file virtualization device. Alternatively, if the customer wishes to split a virtual volume on a file virtualization device into two or more volumes, there is no technique or system that lets the new volumes to be automatically reflected in a new virtual snapshot that provides information about the splitting of the original volume into two or more volumes.

In yet another scenario, if a customer is using file server based replication for data and file virtualization device clusters are front-ending both primary and disaster recovery (or, backup) sites, conventional file virtualization systems fail to efficiently make the replicated snapshots available to client computing devices from the backup site file virtualization device.

The above problems are further intensified if the customer has many years of snapshots that need to be managed. Further, the virtual snapshot itself is not shared with a backup recovery site, which makes it very difficult to recover the state of the file system in the event of a disaster. Using conventional file virtualization devices, usually such recovery, if at all possible, is a time consuming and tedious manual operation highly prone to errors. Furthermore, using current file virtualization devices, maintaining the virtual snapshots while at the same time performing operations such as reconfiguring a file switch, upgrading, renaming, mounting and/or unmounting a new volume, coalescing multiple volumes into a lesser number of volumes, splitting one volume into a plurality of volumes, preventing accidental removal of snapshot rules, and sharing snapshots between two or more file switches or file virtualization devices is complex, time consuming, and error prone. Unfortunately, current file virtualization systems fail to address the above-noted and other problems associated with virtual snapshots.

SUMMARY

A method for reconstituting a virtual snapshot of files in a file virtualization system includes forming at a file virtualization device a virtual snapshot that includes a plurality of physical snapshots associated with one or more file storage devices participating in the virtual snapshot, receiving a request for performing an operation on one or more physical snapshots in the plurality of physical snapshots, providing the one or more physical snapshots in response to the request for performing the operation when the one or more physical snapshots exists in the virtual snapshot, and reconstituting the virtual snapshot by including the one or more physical snapshots to form a reconstituted virtual snapshot in response to the request for performing the operation when the one or more physical snapshots do not exist in the virtual snapshot.

A computer readable medium having stored thereon instructions for reconstituting a virtual snapshot of files in a file virtualization system comprising machine executable code which when executed by at least one processor, causes the processor to perform steps including forming at a file virtualization device a virtual snapshot that includes a plurality of physical snapshots associated with one or more file storage devices participating in the virtual snapshot, receiving a request for performing an operation on one or more physical snapshots in the plurality of physical snapshots, providing the one or more physical snapshots in response to the request for performing the operation when the one or more physical snapshots exists in the virtual snapshot, and reconstituting the virtual snapshot by including the one or more physical snapshots to form a reconstituted virtual snapshot in response to the request for performing the operation when the one or more physical snapshots do not exist in the virtual snapshot.

A file virtualization device includes one or more processors, and a memory coupled to the one or more processors by a bus, at least one of the one or more processors is configured to execute programmed instructions for reconstituting a virtual snapshot of files in a file virtualization system stored in the memory with logic configured to implement forming at a file virtualization device a virtual snapshot that includes a plurality of physical snapshots associated with one or more file storage devices participating in the virtual snapshot, receiving a request for performing an operation on one or more physical snapshots in the plurality of physical snapshots, providing the one or more physical snapshots in response to the request for performing the operation when the one or more physical snapshots exists in the virtual snapshot, and reconstituting the virtual snapshot by including the one or more physical snapshots to form a reconstituted virtual snapshot in response to the request for performing the operation when the one or more physical snapshots do not exist in the virtual snapshot.

The systems and methods disclosed herein offer many advantages. For example, virtual snapshots can be substantially reconstituted in the event of a disaster to form a reconstituted virtual snapshot, and presented to requesting client computing devices. By sharing information related to the virtual snapshot with a disaster recovery site on a regular basis, reconstitution of the virtual snapshot can be performed at both local file virtualization device and a remote file virtualization device at a backup recovery site. Further, the examples disclosed are advantageous in efficiently managing the integrity of the virtual snapshot irrespective of operations being performed at the file virtualization device, e.g., reconfiguring a file switch, upgrading, renaming, coalescing multiple volumes into a lesser number of volumes, mounting and/or unmounting a new volume, splitting one volume into a plurality of volumes, preventing accidental removal of snapshot rules, and sharing snapshot between two or more file switches or file virtualization devices.

DETAILED DESCRIPTION

An example of a system 100 used in a virtual snapshot reconstitution environment is illustrated in FIG. 1, although the examples disclosed herein may be utilized in homogeneous network storage systems with one or more storage devices. The system 100 includes a plurality of client computing devices 104(1)-104(n) communicating with a plurality of servers 102(1)-102(n) over a network 112 and a LAN 114 via a file virtualization device 110. According to various examples disclosed herein, system 100 is a heterogeneous, multi-protocol, multi-vendor, and multi-platform environment where file operations are carried out between client computing devices 104(1)-104(n) and servers 102(1)-102(n).

Figure 1A:
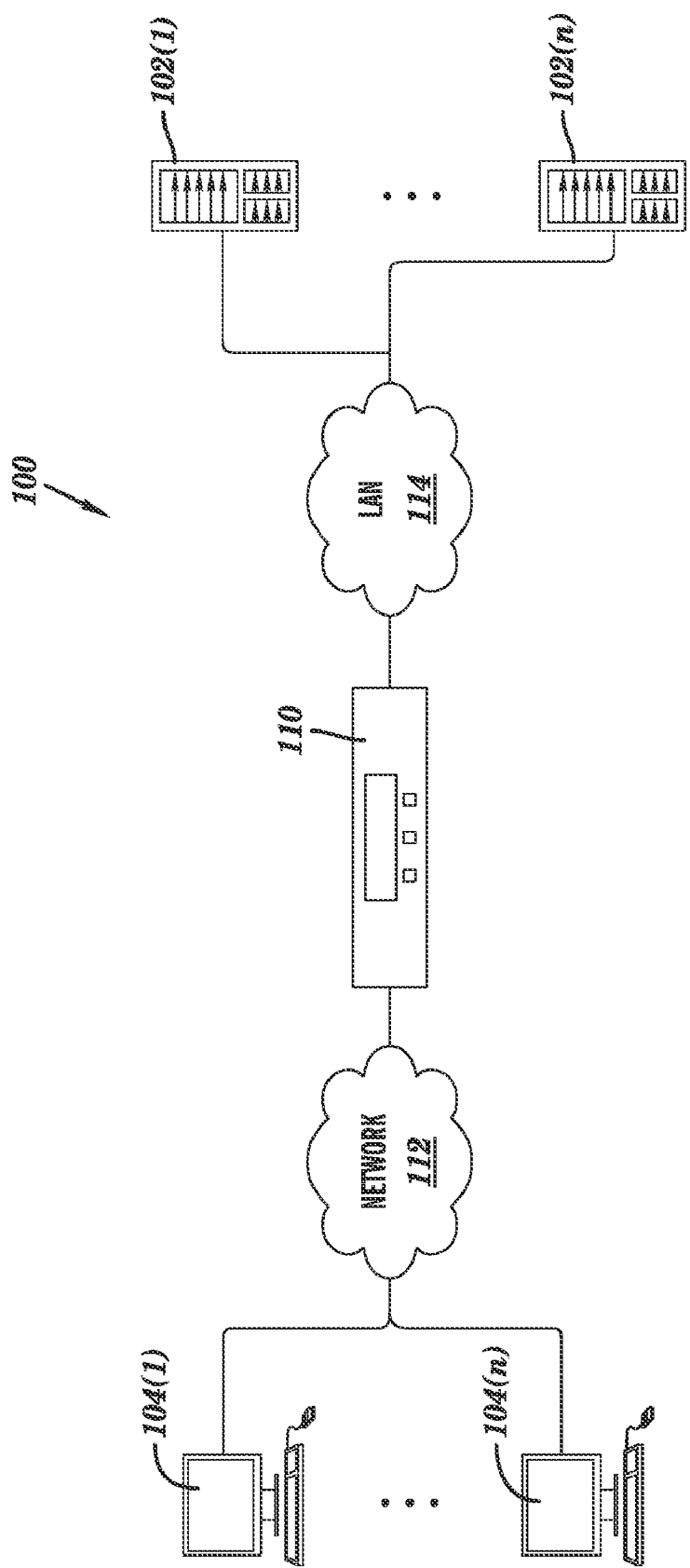
FIG. 1A is a block diagram of an example of a system that generates, stores, reconstitutes, and presents a virtual snapshot stored in a configuration database of a file virtualization device in a heterogeneous network storage system.

The file virtualization device 110 can be used to implement a virtualization layer transparent to the client computing devices 104(1)-104(n) by storing one or more virtual snapshots describing a state of the complete file system at a point in time. Network 112 can provide responses and requests according to the HTTP-based application request for comments (RFC) protocol or the Common Internet File System (CIFS) or network file system (NFS) protocol in this example, but the principles discussed herein are not limited to these examples and can include other application protocols. For clarity and brevity, in FIG. 1A two servers 102(1) and 102(n) are shown, but it should be understood that any number of server devices can use the exemplary network system 100. Likewise, two client computing devices 104(1) and 104(n) are shown in FIG. 1A, but any number of client devices can also use the exemplary network system 100 as well. The ellipses and the designation "n" in FIG. 1A denote an unlimited number of server devices and client devices, respectively.

Servers 102(1)-102(n) comprise one or more server computing machines capable of performing operations, for example, storing files, physical snapshots of the file system, and data related to a virtual state of the file system, operating one or more Web-based applications that may be accessed by network devices in the network 112, such as client computing devices 104(1)-104(n), via file virtualization device 110, and may provide other data representing requested resources, such as particular Web page(s), image(s) of physical objects, and any other objects, responsive to the requests, although the servers 102(1)-102(n) may perform other tasks and provide other types of resources. It should be noted that one or more of the servers 102(1)-102(n) may be a cluster of servers managed by a network traffic management device such as file virtualization device 110. Servers 102(1)-102(n) can be heterogeneous file storage devices or systems provided by independent vendors. Further, according to various examples, servers 102(1)-102(n) can be used to form a tiered storage arrangement where high priority data and/or frequently accessed data is stored in a fast, more expensive storage device, whereas low priority and/or relatively less accessed data can be stored in a slow, less expensive storage device. Such storage tiering can be, for example, based upon a time stamp based policy engine, although other types of policy, e.g., data size based policy, may be used.

The client computing devices 104(1)-104(n) in this example can request one or more physical snapshots associated with one or more volumes in the servers 102(1)-102(n) by sending a request to the file virtualization device 110. The file virtualization device 110 can store an aggregate of one or more physical snapshots into corresponding one or more virtual snapshots to respond to such requests from client computing devices 104(1)-104(n). In addition, client computing devices 104(1)-104(n) can be used for other functions, for example, to run interface applications such as Web browsers that can provide an interface to make requests for and send data to different Web server-based applications via the network 112. A series of applications can run on the servers 102(1)-102(n) that allow the transmission of data, for example, files, configuration data, cookies, descriptor files, namespace data, and other file system data, that is requested by the client computing devices 104(1)-104(n). The servers 102(1)-102(n) can provide data or receive data in response to requests directed toward the respective applications on the servers 102(1)-102(n) from the client computing devices 104(1)-104(n). As per the TCP, packets can be sent to the servers 102(1)-102(n) from the requesting client computing devices 104(1)-104(n) to send data. It is to be understood that the servers 102(1)-102(n) can be hardware and can represent a system with multiple servers, which can include internal or external networks. Alternatively, servers 102(1)-102(n) may be software and can be any version of Microsoft® IIS servers or Apache® servers, although other types of servers can be used. Further, additional servers can be coupled to the network 112 and many different types of applications can be available on servers coupled to the network 112.

Generally, the client devices such as the client computing devices 104(1)-104(n) can include virtually any computing device capable of connecting to another computing device to send and receive information, including Web-based information. The set of such devices can include devices that typically connect using a wired (and/or wireless) communications medium, such as personal computers (e.g., desktops, laptops), mobile and/or smart phones and the like. In this example, the client devices can run Web browsers that can provide an interface to make requests to different Web server-based applications via the network 112. A series of Web-based applications can run on servers 102(1)-102(n) that allow the transmission of data that is requested by the client computing devices 104(1)-104(n). The client computing devices 104(1)-104(n) can be further configured to engage in a secure communication with the file virtualization device 110 and/or the servers 102(1)-102(n) using mechanisms such as Secure Sockets Layer (SSL), Internet Protocol Security (IPSec), Tunnel Layer Security (TLS), and the like.

In this example, the network 112 comprises a publicly accessible network, for example, the Internet, which includes client computing devices 104(1)-104(n), although the network 112 may comprise other types of private and public networks that include other devices. Communications, such as requests from client computing devices 104(1)-104(n) and responses from servers 102(1)-102(n), take place over the network 112 according to standard network protocols, such as the HTTP and TCP/IP protocols in this example, but the principles discussed herein are not limited to this example and can include other protocols. Further, the network 112 can include local area networks (LANs), wide area networks (WANs), direct connections and any combination thereof, other types and numbers of network types. On an interconnected set of LANs or other networks, including those based on different architectures and protocols, routers, switches, hubs, gateways, bridges, and other intermediate network devices may act as links within and between LANs and other networks to enable messages and other data to be sent from and to network devices. Also, communication links within and between LANs and other networks typically include twisted wire pair (e.g., Ethernet), coaxial cable, analog telephone lines, full or fractional dedicated digital lines including T1, T2, T3, and T4, Integrated Services Digital Networks (ISDNs), Digital Subscriber Lines (DSLs), wireless links including satellite links and other communications links known to those skilled in the relevant arts. In essence, the network 112 includes any communication medium and method by which data may travel between client computing devices 104(1)-104(n), servers 102(1)-102(n) and file virtualization device 110, and these examples are provided by way of example only.

LAN 114 can include a private local area network that includes the file virtualization device 110 coupled to the one or more servers 102(1)-102(n), although the LAN 114 may comprise other types of private and public networks with other devices. Networks, including local area networks, besides being understood by those skilled in the relevant arts, have already been generally described above in connection with network 112, and thus will not be described further here.

Each of the servers 102(1)-102(n), file virtualization device 110, and client computing devices 104(1)-104(n) can include a central processing unit (CPU), controller or processor, a memory, and an interface system which are coupled together by a bus or other link, although other numbers and types of each of the components and other configurations and locations for the components can be used. Since these devices are well known to those skilled in the relevant art(s), they will not be described in further detail herein.

In addition, two or more computing systems or devices can be substituted for any one of the systems in the network system 100. Accordingly, principles and advantages of distributed processing, such as redundancy, replication, and the like, also can be implemented, as appropriate, to increase the robustness and performance of the devices and systems of the network system 100. The network system 100 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDN5), the Internet, intranets, a combination thereof, and the like.

As shown in the example environment of network system 100 depicted in FIG. 1A, the file virtualization device 110 can be interposed between the network 112 and the servers 102(1)-102(n) in LAN 114 as shown in FIG. 1A. Again, the network system 100 could be arranged in other manners with other numbers and types of devices. Also, the file virtualization device 110 is coupled to network 112 by one or more network communication links and intermediate network devices, such as routers, switches, gateways, hubs and other devices (not shown). It should be understood that the devices and the particular configuration shown in FIG. 1A are provided for exemplary purposes only and thus are not limiting in number or type.

Generally, the file virtualization device 110 is an exemplary data management device that provides a layer of intelligence in the network 112 and LAN 114 eliminating the inflexible mapping which typically ties client computing devices 104(1)-104(n) to file servers, for example, servers 102(1)-102(n). The file virtualization device 110 decouples the logical access to files from their physical location, so files are free to move and storage devices, e.g., servers 102(1)-102(n), are free to change, without disrupting users, applications, or administrators. File virtualization device 110 implements intelligent file virtualization that simplifies data management further by providing automated, policy-based management across heterogeneous storage environments. File virtualization device 110 is advantageous, for example, in reducing storage expenditures and management overhead, and accelerated business workflows. An example file virtualization device 110 can be the ARX® Series devices provided by F5 networks, Inc. of Seattle, Wash. File virtualization device 110 can be configured to plug directly into existing IP/Ethernet network enabled by network 112 and/or LAN 114, in substantial real-time, for virtualizing heterogeneous file storage devices (e.g., servers 102(1)-102(n)) that present file systems via NFS and/or CIFS, for example. According to one example, file virtualization device 110 does not connect directly to a storage area network (SAN) but can manage SAN data presented through a gateway or server, e.g. any of servers 102(1)-102(n), without changing existing infrastructure in system 100. File virtualization device 110 appears virtually as a single data storage device to client computing devices 104(1)-104(n), and as a single CIFS or NFS client to servers 102(1)-102(n), and is configured to carry out data management rather than storage management, although according to some examples file virtualization device may be configured to carry out certain storage management operations, depending on specific applications for which file virtualization device 110 may be used for. For example, file virtualization device 110 may be configured to automate common storage management tasks (e.g., data migration, storage tiering, and/or load balancing), which take place without affecting access to the file data or requiring re-configuration of file system(s) on client computing devices 104(1)-104(n). File virtualization device 110 creates a file virtualization layer for managing metadata that tracks the location of files and directories that are distributed across servers 102(1)-102(n) in this example. By way of example only, file virtualization device 110 presents a global namespace view of the data, which is an aggregation of the underlying file systems, and masks changes to underlying storage systems from users and applications of client computing devices 104(1)-104(n).

In some examples, file virtualization device 110 can handle requests destined for one or more servers 102(1)-102(n), and, as alluded to earlier, may take the form of one or more TCP/IP data packets originating from the network 112, passing through one or more intermediate network devices and/or intermediate networks, until ultimately reaching the file virtualization device 110, for example. In any case, the file virtualization device 110 may manage the various physical snapshots associated with individual volumes and shares by aggregating them into virtual snapshots stored in a configuration database attached to the file virtualization device 110, in accordance with the processes and systems described further below in connection with FIGS. 1B-4, for example.

Figure 1B:
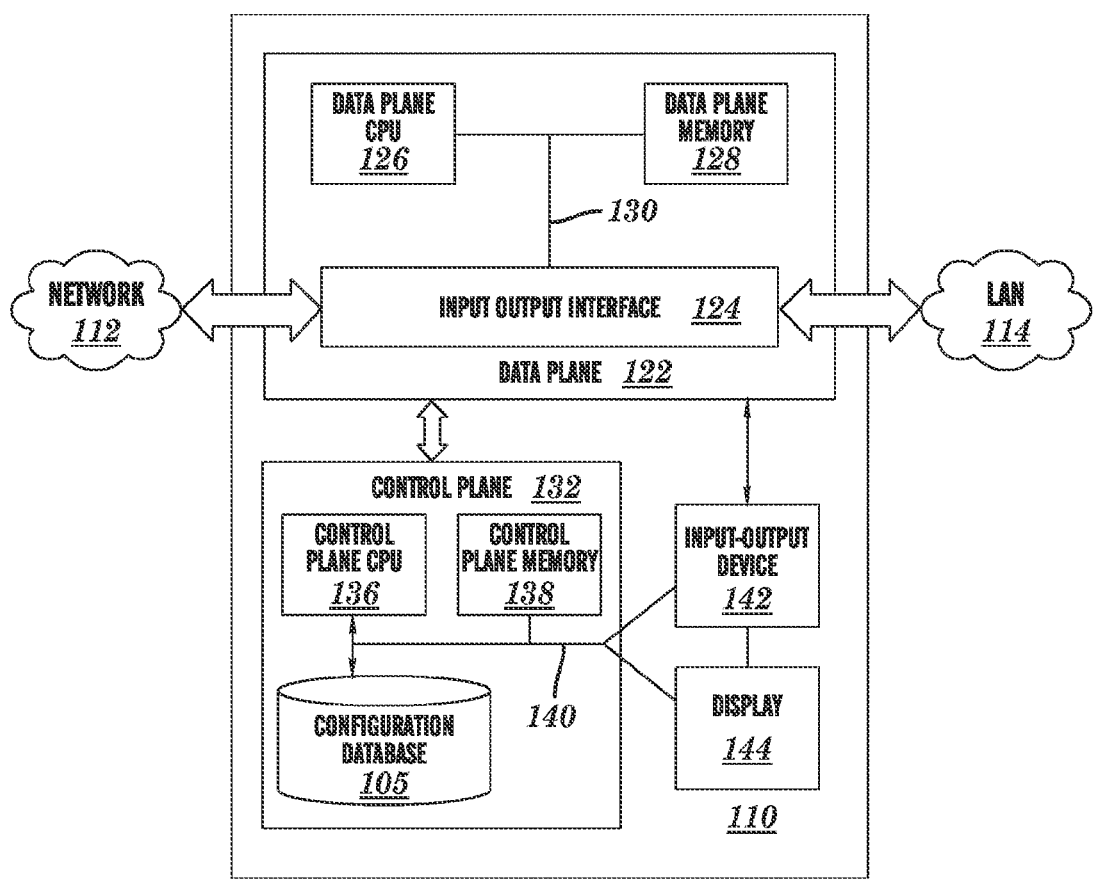
FIG. 1B is a partly functional and partly schematic block diagram of an example file virtualization device.

Referring now to FIG. 1B, a partly functional and partly schematic block diagram of file virtualization device 110 is illustrated. It is to be noted that although a single file virtualization device 110 is shown in FIG. 1A, various examples can also include a plurality of file virtualization devices similar to file virtualization device 110 to perform the methods described herein. File virtualization device 110 includes a data plane 122, a control plane 132, an input-output device 142 and a display 144, although file virtualization device 110 can include other components, for example, power backup system, power supply and cooling systems, and other electronic circuitry to communicate with client computing devices 104(1)-104(n) and servers 102(1)-102(n) via network 112 and LAN 114, respectively. File virtualization device 110 is utilized by client computing devices 104(1)-104(n) to conduct one or more operations with one or more of the servers 102(1)-102(n), such as to view one or more physical snapshots of files on servers 102(1)-102(n), store a file, delete a file, create a file, and restore a file by way of example only, although other numbers and types of systems could be utilizing these resources and other types and numbers of functions could be performed. In some examples, file virtualization device 110 is used for reconstituting or rebuilding virtual snapshots comprising a plurality of physical snapshots associated with one or more file storage devices (e.g., servers 102(1)-102(n)) participating in the virtual snapshot, as described in more detail below with respect to FIG. 2.

By way of example only, data plane 122 functions to provide a data path that handles non-metadata operations at wire speed, and control plane 132 functions to provide handling of operations that affect metadata and migration of file data on servers 102(1)-102(n). Each path provided by data plane 122 and control plane 132, respectively, has dedicated processing and memory resources and each can scale independently, based upon varying network and storage conditions. Further by way of example only, data plane 122 and control plane 132 enable file virtualization device 110 to provide an enterprise scale functionality for handling greater than two billion files at a throughput greater than 2 GBps in a single switch, such as the file virtualization device 110. According to one example, control plane 132 is configured to provide comprehensive logging, reporting, hosting Simple Network Management Protocol (SNMP) and other protocols, a "call-home" functionality from file virtualization device 110 to a customer support site, and port mirroring during various file operations.

In this example, data plane 122 includes a data plane processor (CPU) 126, a data plane memory 128, and an input-output interface 124 coupled to each other through an internal data plane bus 130. Similarly, in this example, control plane 132 includes a control plane processor (CPU) 136, a control plane memory 138, and a configuration database 140 for storing one or more virtual snapshots related to the file system managed by file virtualization device 110, all coupled together by an internal control plane bus 140. Data plane CPU 126 and control plane CPU 136 can be each be characterized by any one or more of the following component configurations: computer readable medium and logic circuits that respond to and process instructions fetched from the data plane memory 128; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other examples of the data plane CPU 126 can include any combination of the following: a microprocessor, a microcontroller, a central processing unit with a single processing core, a central processing unit with two processing cores, or a central processing unit with more than one processing core. In some examples, control plane CPU 136 can be a SiByte® MIPS core processor provided by Broadcom Corporation of Irvine, Calif.

In some examples, the internal control plane bus 140 and data plane bus 130 can be used by the control plane CPU 136 and data plane CPU 126, respectively, to communicate with one or more input-output (I/O) devices 142 via input-output interface 124. In some examples, the control plane bus 140 and data plane bus 130 can be anyone of the following types of buses: a VESA VL bus; an ISA bus; an EISA bus; a Micro Channel Architecture (MCA) bus; a PCI bus; a PCI-X bus; a PCI-Express bus; or a NuBus. Other examples of the file virtualization device 110 include display 144 that communicates with the data plane CPU 126 and/or control plane CPU 136 via an Advanced Graphics Port (AGP).

Included within some examples of the data plane 122 and control plane 132 are the data plane memory 128 and control plane memory 138, respectively, both of which can be any one of the following types of memory: SRAM; BSRAM; or EDRAM. Other examples include data plane memory 128 that can be anyone of the following types of memory: Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDECSRAM, PCIOO SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), disk type memory, tape memory, spinning storage media, or any other type of memory device capable of executing the systems and methods described herein. In some examples, control plane memory 138 can include a battery backed NV-RAM to store transient packet related data and other information related to reconstitution of virtual snapshots, thereby enabling integrity of in-flight data operations. In some other examples, control plane memory 138 can store an operating system used for file virtualization device 110, and log files generated during operation of file virtualization device 110.

One example of the file virtualization device 110 provides support for anyone of the following installation devices: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a harddrive or any other device suitable for installing applications or software. Applications can, in some examples, include a client agent, or any portion of a client agent. The file virtualization device 110 may further include a storage device (not shown separately) that can be either one or more hard disk drives, or one or more redundant arrays of independent disks; where the storage device is configured to store an operating system, software, programs applications, or at least a portion of the client agent. A further example of the file virtualization device 110 can include an installation device that is used as the storage device.

Furthermore, the file virtualization device 110 may include the input-output interface 124 in the data plane 122 to communicate with network 112, LAN 114, a Wide Area Network (WAN) or the Internet through a variety of connections including, but not limited to, standard telephone lines, LAN or WAN links (e.g., 802.11, T1, T3, 56 kb, X.25, SNA, DEC-NET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the file virtualization device 110 includes a network interface (e.g., input-output interface 124) able to communicate with additional computing devices via any type and/or form of gateway or tunneling protocol such as Secure Socket Layer (SSL) or Transport Layer Security (TLS), or the Citrix Gateway Protocol manufactured by Citrix Systems, Inc. of Fort Lauderdale, Fla. Versions of the network interface device can comprise anyone of: a built-in network adapter; a network interface card (NIC); a PCMCIA network card; a card bus network adapter; a wireless network adapter; a USB network adapter; a modem; or any other device suitable for interfacing the file virtualization device 110 to a network, the file virtualization device 110 being capable of and configured to perform the methods and implement the systems described herein.

In various examples, the file virtualization device 110 can include any one of the following input-output device 142: a keyboard; a pointing device; a mouse; a gesture based remote control device; an audio device; track pads; an optical pen; trackballs; microphones; drawing tablets; video displays; speakers; inkjet printers; laser printers; and dye sublimation printers; or any other input/output device able to perform the methods and systems described herein. Input-output device 142 may in some examples connect to multiple input-output devices external to file virtualization device 110. Some examples of the input-output device 142 may be configured to provide storage or an installation medium, while others may provide a universal serial bus (USB) interface for receiving USB storage devices such as the USB Flash Drive line of devices manufactured by Twintech Industry, Inc. Still other examples of input-output device 142 may be a bridge between the data plane bus 130, control plane bus 140, and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus. Further, file virtualization device 110 can be single powered or dual-powered depending upon specific user needs.

In various examples, display 144 in the file virtualization device 110 is used to display information, such as a status message, a power down or power-up information, a file status or directory status, although other types and amounts of information can be displayed in other manners. The display can include a computer display screen, such as a CRT or LCD screen, although other types and numbers of displays, e.g., LED displays, could be used.

File virtualization device 110 configured to manage file virtualization and the generation, storage, presentation, and reconstitution of unified virtual snapshots, although other numbers and types of systems can be used and other numbers and types of functions can be performed. Data plane CPU 126 and control plane CPU 136 execute one or more programs of stored instructions for one or more aspects of managing file virtualization and the reconstitution of unified virtual snapshots, although the data plane CPU 126 and control plane CPU 136 could execute other numbers and types of programmed instructions. File virtualization device 110 can be configured in a manner that data plane CPU 126 and control plane CPU 136 may also include a computer readable medium having instructions stored thereon for one or more aspects of reconstituting a virtual snapshot as described herein, which when executed by a processor, cause the processor to carry out the steps necessary to implement the methods, as described and illustrated herein. The examples of file virtualization device 110 provide numerous advantages. For example, file virtualization device 110 can be used to perform real-time management of live data, dynamic load-balancing, in-line file placement in which files are not placed on the wrong share and then migrated after the error in file placement is detected, without reliance on stubs or redirection. Further, file virtualization device can reduce data outages and business disruption, enable faster migrations with low operational overhead, and without any client reconfiguration.

By way of example only, data plane 122 and control plane 132 in file virtualization device 110 are configured to translate a client request received from client computing devices 104(1)-104(n) over network 112 at the input-output interface 124 of data plane 122 into a request from file virtualization device 110 to servers 102(1)-102(n) over LAN 114. Upon receipt of the request, data plane 122 communicates with control plane 132 to search for virtual snapshot data related to the request in a configuration database 105. Control plane 132 returns data related to the request to data plane 122, which then forwards it to file data and metadata stores in servers 102(1)-102(n). Alternatively, file virtualization device 110 may be configured to receive responses from file data and metadata stores in servers 102(1)-102(n). In such a scenario, file virtualization device 110 can store outcome of various file operations into a virtual snapshot, described in more detail in FIG. 2, in a configuration table 106 for virtual snapshots in configuration database 105 within control plane 132. Further, file virtualization device 110 can forward data in a virtual snapshot to a requesting client computing device in the client computing devices 104(1)-104(n) based upon the request from the client computing device. File virtualization device 110, for example, issues such a reply to the client computing devices 104(1)-104(n) using information gathered from respective file data and metadata stores in servers 102(1)-102(n).

By way of example only, configuration database 105 can be a relational database including various fields, records, and files, used in conjunction with a database management system, although other types of databases may also be used, as known to one of ordinary skill in the art. In some examples, configuration database 105 is within file virtualization device 110. Alternatively, configuration database 105 may be attached physically outside file virtualization device 110. According to various examples disclosed herein, configuration database 105 contains all of the file virtualization device 110's configuration information, which is specific to each customer's needs. For example, configuration database 105 has one or more states of the virtual snapshot 200, data related to the network/IP addresses to use, the usernames/passwords to administer the file virtualization device 110, the virtualization layer description, the IP addresses client computing device 104(1)-104(n) access to get to virtualized file systems, for example, system 100, and other network and device related information for file virtualization device 110. In one example, configuration database 105 can be an object manager database (OMDB) that stores one or more virtual snapshots in configuration table 106, as explained in detail in FIG. 2. Further, configuration database 105 may be distributed among various rule and policy engines executing on file virtualization device 110.

Figure 2:
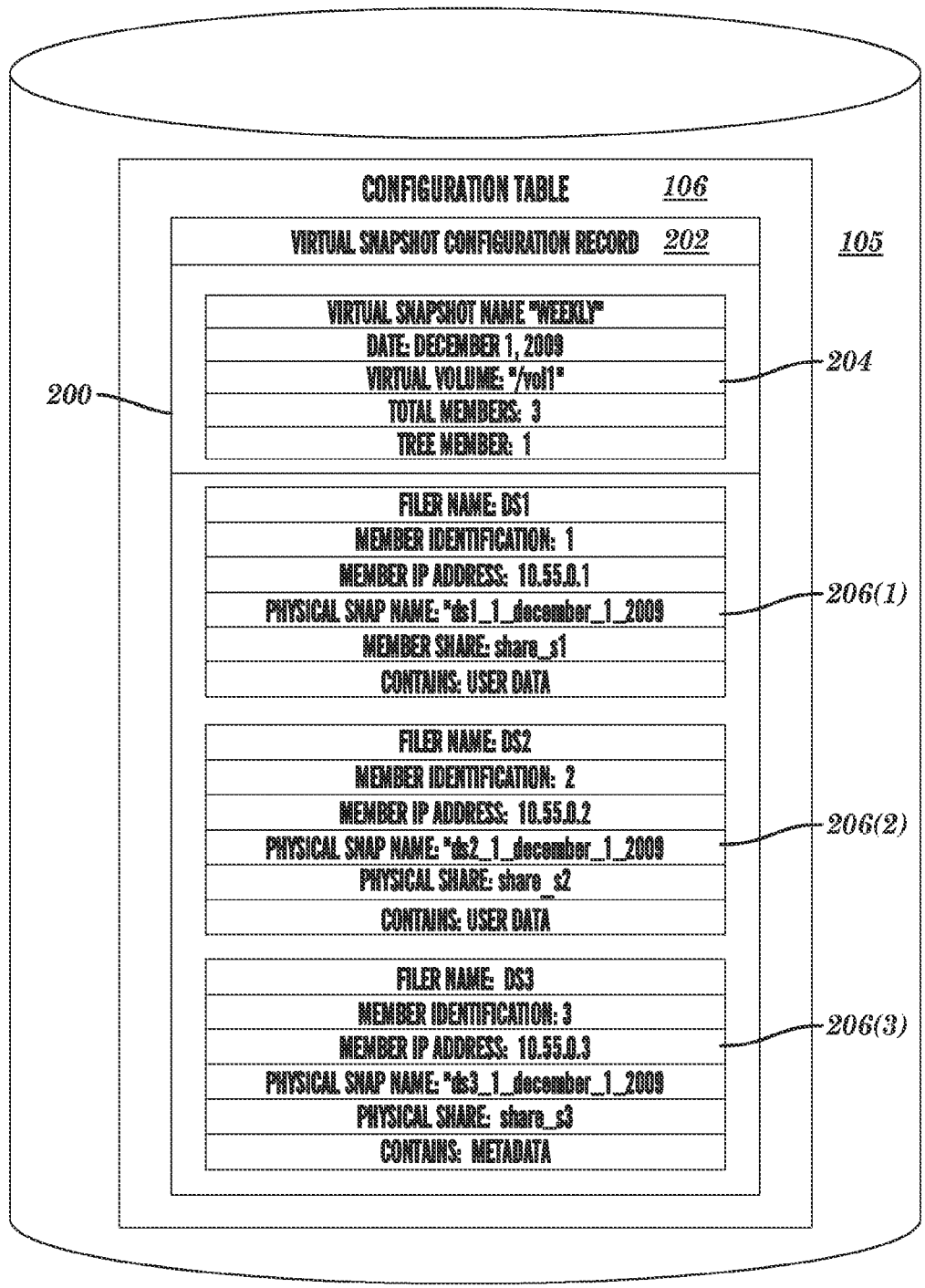
FIG. 2 is an example of a virtual snapshot stored in configuration table of the configuration database of FIG. 1B.

Referring to FIG. 2, an example of a virtual snapshot 200 stored in configuration table 106 of configuration database 105 is illustrated, although configuration table 106 may store a plurality of virtual snapshots similar to virtual snapshot 200. Virtual snapshot 200 is created by requesting or invoking a capture of physical snapshots of content on various servers 102(1)-102(n) using, for example, an application programming interface (API) or a command line interface (CLI). Once all of the physical snapshots 206(1)-206(3) have been captured or otherwise completed by file virtualization device 110, the unified virtual snapshot is generated and storage data communications are resumed. The unified virtual snapshot 200 comprises the captured physical snapshots 206(1)-206(3) which are mapped together to form the virtual snapshot 200. In addition, a single physical snapshot can be mapped to a plurality of virtual snapshots similar to virtual snapshot 200. According to one example, virtual snapshot 200 is composed of one or more physical snapshots 206(1)-206(3), and can span multiple file systems or file servers, e.g., servers 102(1)-102(n) depending on configuration of the file system in servers 102(1)-102(n). A physical snapshot is a point in time state of file system that exists on a file server in the plurality of servers 102(1)-102(n). For example, the physical snapshot can be created by a file server among servers 102(1)-102(n) (e.g., via a schedule). Alternatively, the physical snapshot may have been created by the file virtualization device 110 when creating the virtual snapshot 200. According to one example, each of the plurality of physical snapshots 206(1)-206(3) includes a time dependent state of the files in system 100.

According to the example shown in FIG. 2, virtual snapshot 200 includes records, e.g., a virtual snapshot configuration record 202, although the virtual snapshot 200 may include other data and a plurality of records. Virtual snapshot configuration record 202 includes, for example, a header field 204 that contains data about virtual snapshot name, a date and time of creation of virtual snapshot 200, a virtual volume name, a total number of member physical snapshots associated with the virtual volume, and an identification number for the header field 204.

In this example, virtual snapshot configuration record 202 contains information related to a set of physical snapshots 206(1)-206(3), although virtual snapshot configuration record 202 may include a larger or a smaller number of physical snapshots, as can be contemplated by one of ordinary skill in the art, after reading this disclosure. Physical snapshot 206(1) includes various fields, for example, a "filer name" field indicating which of the servers 102(1)-102(n) physical snapshot 206(1) belongs to, a member identification number for the physical snapshot, a network address (e.g., an IP address) for the physical snapshot 206(1), a physical snapshot name, a member share pathname to determine an access to the physical snapshot from a perspective of client computing devices 104(1)-104(n), and information about type of data referred to by the physical snapshot 206(1), although the physical snapshot 206(1) may include additional or lesser number of fields and data. Similarly, physical snapshots 206(2) and 206(3) may contain fields similar to physical snapshot 206(1), and will not be described in detail herein.

It is to be noted that although physical snapshots 206(1)-206(3) are shown as part of virtual snapshot 200, one or more of physical snapshots 206(1)-206(3) may also be part of other virtual snapshots apart from virtual snapshot 200. For example, various physical snapshots (e.g., physical snapshots 206(1)-206(3)) can be related to various virtual snapshots (e.g., virtual snapshot 200) by a mapping table, e.g., Table 1 below, stored in configuration database 105 shown below, although other forms of forming associations between physical snapshots and virtual snapshots could be used.

TABLE I

Physical Snapshots Relationships

| Physical Snapshot Name | Virtual Snapshot Name | File System | Relationships |
|---|---|---|---|
| acopia_1 | daily.1 | /vol/vol1 | ns1:/vol1, sh1, daily |
| acopia_2 | daily.1 | /vol/vol2 | ns1:/vol1, sh2, daily |
| | | | ns1, /vol2, sh3, daily |
| acopia_3 | daily.1 | /vol/vol3 | ns1, /vol2, sh4, daily |
| acopia_4 | monthly.1 | /vol/vol1 | ns1:/vol1, sh1, monthly |
| acopia_5 | monthly.1 | /vol/vol2 | ns1:/vol1, sh2, monthly |

Accordingly, in Table I, by way of example only, physical snapshot 206(1) can have a physical snapshot name "acopia_1" is associated with a virtual snapshot daily.1, and is allotted a path /vol/vol1 on file virtualization device 110. According to the relationship column in Table I, physical snapshot 206(1) can be associated with a share "sh1" on a volume "vol1" on any of servers 102(1)-102(n), and has an updating periodicity of once a day ("daily"). Physical snapshot 206(1), therefore is denoted with a namespace and rule as: "ns1:/vol1, sh1, daily." Similarly, other physical snapshots are mapped to virtual snapshots and are allotted namespace and rules.

Figure 3:
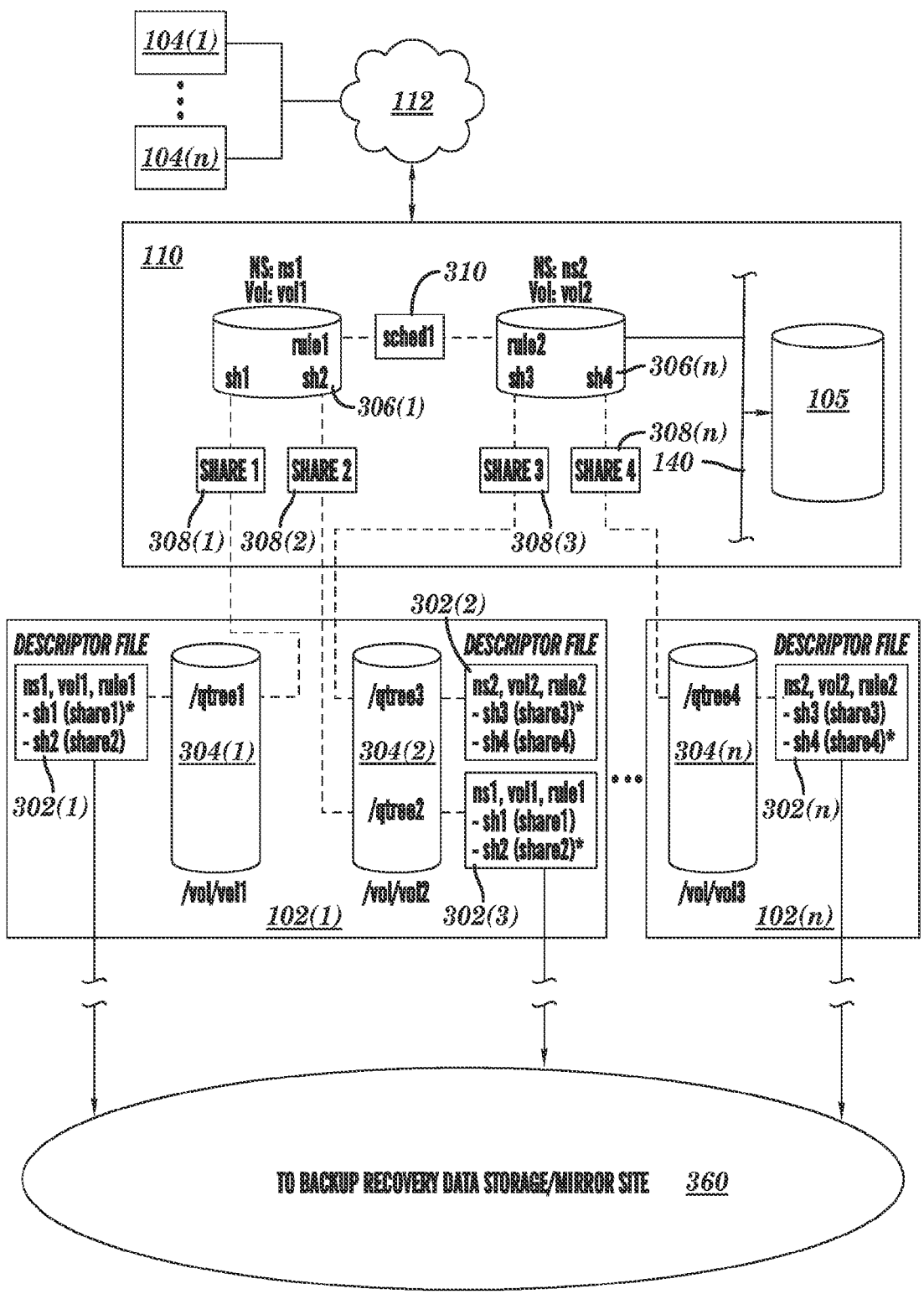
FIG. 3 is an example of snapshot descriptor files associated with physical snapshots in the system of FIG. 1A.

Referring now to FIG. 3, a detailed view of namespace and rules for various physical snapshots with respect to servers 102(1)-102(n) are illustrated. In this example, configuration database 105 in file virtualization device 110 provides namespace and rule engines for four exemplary physical snapshots associated with four exemplary shares "sh1," "sh2," "sh3," and "sh4" on three exemplary volumes "vol1"-"vol3" on servers 102(1)-102(n) (e.g., "vol 1" and "vol2" are on server 102(1), and "vol3" is on server 102(n)), although other numbers and types of shares and volumes may be used depending upon a state of the file system, as will be apparent to one of ordinary skill in the art after reading this disclosure.

The example arrangement shown in FIG. 3 can be stored as a file in configuration database 105. By way of example only, such a file can be written as a code shown in Table 2 below.

TABLE 2

```
namespace ns1
    volume /vol1
        share sh1
            ...
        share sh2
            ...
        snapshot rule sched1
            schedule daily
            ...
        snapshot rule sched1
            schedule monthly
            ...
namespace ns2
    volume /vol2
        share sh3
            ...
        share sh4
            ...
        snapshot rule sched1
            schedule daily
            ...
```

In this example, configuration database 105 is used to maintain data related to physical snapshots 206(1)-206(3) using rule engines 306(1)-306(n) that operate to update physical snapshots 206(1)-206(3) based upon a scheduler 310 (shown as "sched1"). Shares 308(1)-308(n) are spaces allotted on volumes 304(1)-304(n) on respective servers 102(1)-102(n), as shown. Each of shares 308(1)-308(n) fall under one or more rule engines 306(1)-306(n) to form respective physical snapshots. It is to be noted that although two rule engines 306(1)-306(n) are shown, a higher or a lower number of rule engines may be used.

As discussed above with respect to FIG. 2, the namespace, shares, volumes and rules form one or more physical snapshots 206(1)-206(3) that denote a point-in-time state of a file system, for example, system 100 of FIG. 1. In this example, prior to creation of virtual snapshots (e.g., virtual snapshot 200) by file virtualization device 110, a set of descriptor files 302(1)-302(n) unique to each of physical snapshots 206(1)-206(3) are written on servers 102(1)-102(n). Descriptor files 302(1)-302(n) include data about physical snapshots (e.g., 206(1)-206(3)) that enable file virtualization device 110 to reconstitute physical snapshots 206(1)-206(3) into a virtual snapshot by relying on existence of data external to the file virtualization device 110. By way of example only, during a scenario where virtual snapshot 200 is not available, file virtualization device 110 can rely on descriptor files 302(1)-302(n) to rebuild or reconstitute the virtual snapshot 200 into a reconstituted virtual snapshot, as will be described in detail in FIG. 4. Alternatively, file virtualization device 110 may rely on other forms of external data (e.g., data related to physical snapshots encoded onto various local databases in servers 102(1)-102(n)) to reconstitute virtual snapshot 200. One exemplary way to maintain and provide external data to file virtualization device 110 is to make it a part of the virtual snapshot the file virtualization device 110 takes. This is accomplished by writing one or more descriptor files 302(1)-302(n) to one or more directories of each share among shares 308(1)-308(n) participating in the virtual snapshot 200 prior to taking the actual virtual snapshot 200. When the file virtualization device 110 invokes a snapshot interface of servers 102(1)-102(n), the written snapshot descriptor files 302(1)-302(n) become a permanent part of each of the physical snapshots (e.g., physical snapshots 206(1)-206(3)). The information written to descriptor files 302(1)-302(n) can be used by the file virtualization device 110 (or, another switch similar to file virtualization device 110) to re-associate (or, reconstitute) the physical snapshots 206(1)-206(3) into one or more virtual snapshots, e.g., virtual snapshot 200.

According to one example, descriptor files 302(1)-302(n) are each unique snapshot files that are created in each of shares 308(1)-308(n) that is a part of the virtual snapshot 200. If the file virtualization device 110 configuration is such that grouping takes place, multiple snapshot descriptor files 302(1)-302(n) are created (each with unique information) on different directory paths in the same physical snapshot, e.g., physical snapshot 206(1). For example, if there are two shares in shares 308(1)-308(n) that map to a common file server file system in servers 102(1)-102(n), there are two unique snapshot descriptor files in two directory path locations on the file system in servers 102(1)-102(n), although a higher or lower number of shares and descriptor files may be used. By way of example only, each of snapshot descriptor files 302(1)-302(n) is written to a specific directory on each of shares 308(1)-308(n) participating in the physical snapshot before the virtual snapshot 200 is initiated. Further, since each descriptor file 302(1)-302(n) is written into each of shares 308(1)-308(n), and each of shares 308(1)-308(n) can be imported by one file virtualization device 110, there is no chance of a collision. Once the snapshot is initiated, the snapshot descriptor file becomes a permanent part of the snapshot. When the file virtualization device 110 has completed the physical snapshot operation to create physical snapshots 206(1)-206(3), the snapshot descriptor file may be removed from all relevant shares. The snapshot descriptor files 302(1)-302(n) contain information describing how a physical snapshot (e.g., physical snapshot 206(1)) relates to a configuration of file virtualization device 110 stored, for example, in configuration database 105. By way of example only, snapshot descriptor files 302(1)-302(n) can be created in a format that is easily parsed and is easily extensible by file virtualization device 110 and servers 102(1)-102(n), and can support internationalized character sets, and other information useful in rebuilding virtual snapshot 200 into a reconstituted virtual snapshot.

According to one example, snapshot descriptor files 302(1) written for each of shares 308(1)-308(n) can contain virtual characteristics associated with shares 308(1)-308(n). For example only, these virtual characteristics can include a name of the file virtualization device 110 that initiated the virtual snapshot 200, a version number of software used for file virtualization device 110, graphical user interface (GUI) of file virtualization device 110 that initiated the virtual snapshot 200, a virtual snapshot time (for example, in Coordinated Universal Time, or "UTC"), a namespace name, a volume name for each of volumes 304(1)-304(n), a snapshot rule name, a snapshot rule schedule name, a snapshot instance number, a snapshot generation number, a snapshot rule presentation name, a snapshot rule retain count (for troubleshooting purposes, for example), and a snapshot report prefix, and other information, for example, a location information where a metadata file for a physical snapshot is located (shown, for example, as "–sh1 (share1)*" in descriptor file 302(1) in FIG. 3.

According to another example, one or more of descriptor files 302(1)-302(n) can include a list of all shares 308(1)-308(n) (for each namespace (NS) shown in Table 2, volumes 304(1)-304(n), and rules in rule engines 306(1)-306(n)) that make up the virtual snapshot 200 (for example, for troubleshooting purposes). The share information for each of shares 308(1)-308(n) includes, for example, share name used by file virtualization device 110, object name for each of shares 308(1)-308(n) used by respective servers 102(1)-102(n), network address for servers 102(1)-102(n) (e.g., IP address), a physical share name for each of shares 308(1)-308(n), and a primary share flag for each of shares 308(1)-308(n), which flag is set if a particular share in shares 308(1)-308(n) is the destination share for the metadata file associated with a corresponding physical snapshot among physical snapshots 206(1)-206(3).

According to one example, during creation of virtual snapshot 200, for each physical file system in servers 102(1)-102(n) to be snapped or recorded at an instance in time, a unique snapshot descriptor file (e.g., descriptor file 302(1)) per share for each of shares 308(1)-308(n) is created. If a descriptor file (e.g., descriptor file 302(1)) already exists, then it is overwritten. By way of example only, when a grouped physical snapshot (including multiple physical snapshots 206(1)-206(3)) is taken, multiple unique snapshot descriptor files 302(1)-302(n) can reside on the physical file system being snapped or recorded. When the snapshot operation is successful for all physical snapshots 206(1)-206(3), the snapshot information is stored in the configuration table 106 of configuration database 105 (e.g., in an OMDB format, well known to one of ordinary skill in the art).

According to one example, descriptor files 302(1)-302(n) can be sent to a backup recovery data storage/mirror site 360 on a regular or an "as-and-when required" basis. Such backup of descriptor files 302(1)-302(n) can be useful, for example, during reconstituting virtual snapshot 200 in a catastrophic disaster scenario affecting system 100 where data corresponding to physical snapshots 206(1)-206(3) and virtual snapshot 200 is destroyed, although sending descriptor files 302(1)-302(n) and other information from system 100 to backup recovery data storage/mirror site 360 may be useful in other scenarios also, as described below in additional examples. Backup recovery data storage/mirror site 360 can be a site physically separate from system 100, and can be a part of an independent data recovery site that handles requests from client computing devices 104(1)-104(n) when system 100 is unavailable for various reasons. By way of example only, backup recovery data storage/mirror site 360 can be in a separate building from system 100 within a local campus of an organization deploying system 100, which is the primary site, and connected to system 100 by a high-speed fiber optic link, for example. Alternatively, backup recovery data storage/mirror site 360 may be hundreds of miles away from system 100 in a different city, state, country, or continent, for example.

Figure 4:
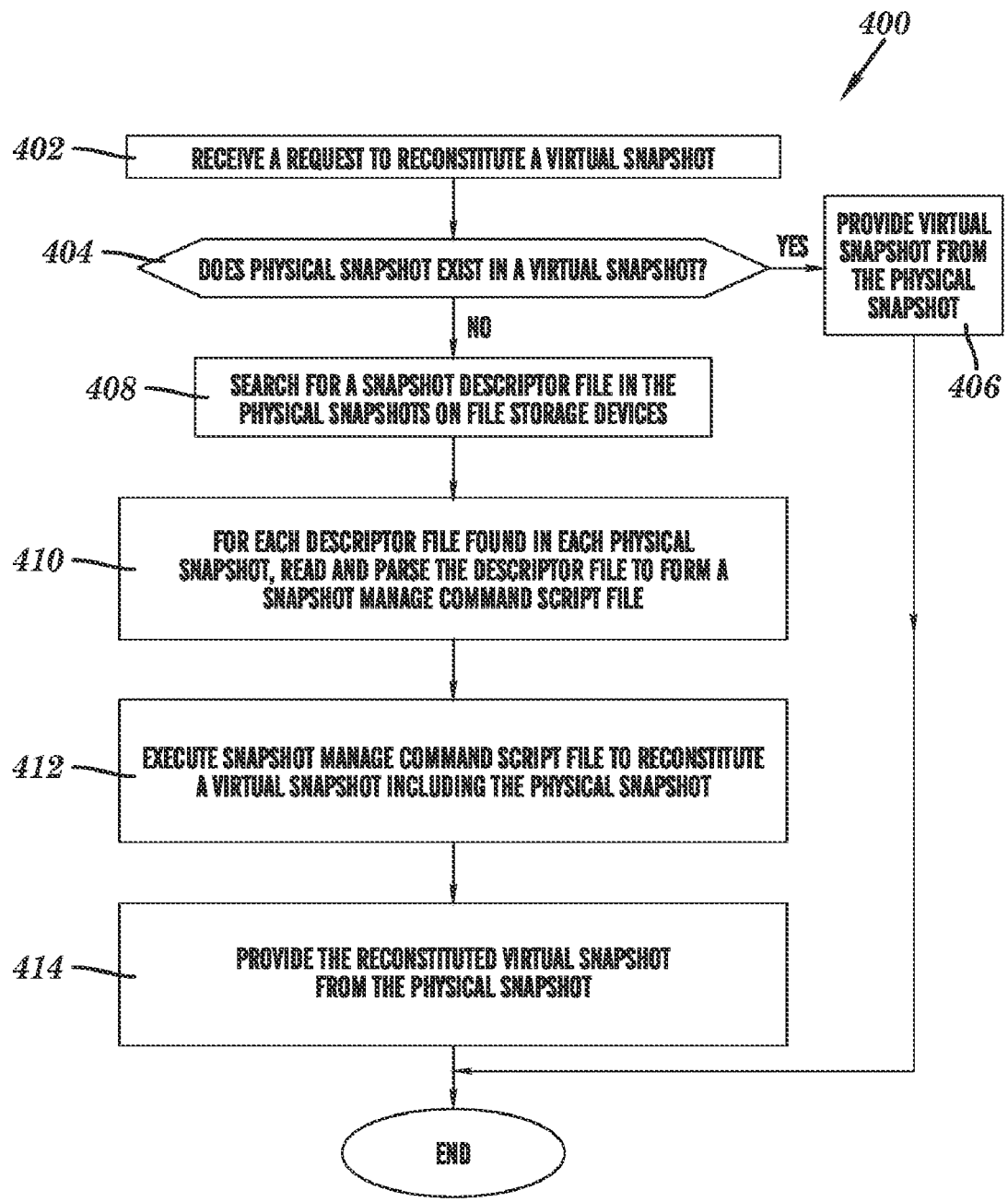
FIG. 4 is a flow chart of the example of a method reconstituting a virtual snapshot of files in a file virtualization system.

The operation of an example process for reconstituting a virtual snapshot at file virtualization device 110 shown in FIGS. 1A-3, which may be run on the file virtualization device 110, will now be described with reference back to FIGS. 1A-3 in conjunction with a flow diagram shown in FIG. 4. The flow diagram in FIG. 4 is representative of example machine readable instructions for implementing the file virtualization device 110 and/or the process of reconstituting a virtual snapshot using a network device, e.g., file virtualization device 110. In this example, the machine readable instructions comprise an algorithm for execution by: (a) a processor, (b) a controller, and/or (c) one or more other suitable processing device(s). The algorithm may be implemented in software stored on tangible computer readable media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or implemented in firmware or dedicated hardware in a well known manner (e.g., it may be implemented by an application specific integrated circuit (ASIC), a programmable logic device (PLD), a field programmable logic device (FPLD), a field programmable gate array (FPGA), discrete logic, etc.). For example, at least some of the components of the file virtualization device 110 could be implemented by software, hardware, and/or firmware. Also, some or all of the machine readable instructions represented by process of the flowchart of FIG. 4 may be implemented manually. Further, although the example algorithm is described with reference to the flowchart illustrated in FIG. 4, persons of ordinary skill in the art will readily appreciate that many other methods of implementing the example machine readable instructions may alternatively be used. For example, the order of execution of the blocks may be changed, and/or some of the blocks described may be changed, eliminated, or combined.

Referring now to FIG. 4, in step 402, file virtualization device 110 receives one or more requests from one or more of client computing devices 104(1)-104(n) for reconstituting one or more virtual snapshots (e.g., virtual snapshot 200). The requests from client computing devices 104(1)-104(n) can be for a specific physical snapshot (e.g., physical snapshot 206(1)), or the requests may include requests for performing an operation on one or more physical snapshots 206(1)-206(3). Further, the requests from client computing devices 104(1)-104(n) may include requests for viewing a complete virtual snapshot (e.g., virtual snapshot 200) including all physical snapshots 206(1)-206(3). Such requests from the client computing devices 104(1)-104(n) can arise or can be triggered in response to a variety of situations or events. By way of example only, such a request may be received because the file virtualization device 110 experiences a catastrophic failure and a complete reconfiguration of the file virtualization device 110 is required, so that the file virtualization device 110 has to "re-learn" all the snapshots managed prior to the failure, and a translation of physical snapshots 206(1)-206(3) into virtual snapshot 200 is required. In another exemplary scenario, a customer deploying file virtualization device 110 may elect to purchase a newer and faster version of file virtualization device 110, for which existing virtual snapshots (e.g., virtual snapshot 200) managed by file virtualization device 110 need to be transferred to the newer file virtualization device 110. Further by way of example only, in another scenario that can trigger requests for reconstituting virtual snapshots stored by configuration table 106 of configuration database 105 of file virtualization device 110, a customer using file server based replication with servers 102(1)-102(n) for data where the file virtualization device 110 front-ends both the primary site of system 100 and backup recovery data storage/mirror site 360, may require a file virtualization device at the backup recovery data storage/mirror site 360 to make replicated virtual snapshots available to client computing devices 104(1)-104(n).

In yet another exemplary scenario, a customer deploying the file virtualization device 110 may desire to change the file storage topology of system 100 by splitting one or more volumes 304(1)-304(n), and may need to accordingly reconstitute and transfer data about the virtual snapshot 200 to reflect the newer volumes. Other exemplary scenarios in which virtual snapshot reconstitution requests may be received from client computing devices 104(1)-104(n) are discussed in detail below with respect to various exemplary use-cases. According to one example, request for reconstituting a virtual snapshot from one or more client computing devices 104(1)-104(n) can be obtained via a command line interface program that client computing devices 104(1)-104(n) can access at the file virtualization device 110. Alternatively, client computing devices 104(1)-104(n) may send the request in step 402 via a graphical user interface (GUI) installed at the client computing devices 104(1)-104(n).

In step 404, based upon the requests from client computing devices 104(1)-104(n), file virtualization device 110 checks whether the requested physical snapshot exists in the virtual snapshot 200. If the requested physical snapshot (e.g., physical snapshot 206(1)) exists in the virtual snapshot 200, the flow proceeds to step 406 where file virtualization device 110 provides the virtual snapshot 200 including the requested physical snapshot to the requesting client computing device among client computing devices 104(1)-104(n), and the process of flowchart 400 ends.

If the requested physical snapshot does not exist in the virtual snapshot stored in configuration, in step 408, file virtualization device 110 initiates a search for a snapshot descriptor file (e.g., descriptor file 302(1)) associated with the requested physical snapshot on servers 102(1)-102(n). In order to provide requesting client computing devices 104(1)-104(n) with an easy way to see which physical snapshots 206(1)-206(3) are available on shares 308(1)-308(n), file virtualization device 110 performs a survey of the physical snapshots 206(1)-206(3) that are seen through the shares 308(1)-308(n) in one or more managed volumes 304(1)-304(n). A physical snapshot survey is used by file virtualization device 110 to determine what physical snapshots 206(1)-206(3) are available for reconstitution based upon the reconstitution request from client computing devices 104(1)-104(n). A reporting mechanism reports the information in any snapshot descriptor files 302(1)-302(n) available on physical snapshots 206(1)-206(3). To enable the searching in step 408 by the file virtualization device 110, a surveying mechanism to list the visible physical snapshots 206(1)-206(3) on one or more shares 308(1)-308(n) attached to one or more volumes 304(1)-304(n) is provided. The surveying function implemented by the file virtualization device 110 provides the ability to display the contents of any snapshot descriptor files 302(1)-302(n) that exist on the visible physical snapshots 206(1)-206(3), and a method to trouble-shoot and plan reconstitution of virtual snapshot 200 for fulfilling one or more requests from client computing devices 104(1)-104(n).

According to one example, the file virtualization device 110's searching for the requested physical snapshot using the surveying capability can be performed via a command line interface (CLI) command. By way of example only, a CLI command to enable to surveying functionality of file virtualization device 110 can be of the form:
SHIPYARD# snapshot survey <namespace><volume> [share <share>][detailed] {[origin [arx] 1 [external]]} [report-prefix <prefix>]
where:<namespace> is the name of a namespace configured on the file virtualization device 110, <volume> is a configured volume (e.g., volume 304(1)) in a namespace (e.g., NS in Table 2), <share> is a configured share in shares 308(1)-308(n) in volumes 304(1)-304(n)<volume>/namespace <namespace>, "detailed" instructs the file virtualization device 110 to report the physical snapshot names (shown in FIG. 2, for example) and the content of any snapshot descriptor files 302(1)-302(n) found associated with the physical snapshots 206(1)-206(3), "origin" is a keyword that allows a user of requesting client computing devices 104(1)-104(n) to specify a filter for what types of physical snapshots 206(1)-206(3) to display on display 144, for example, "arx" instructs the file virtualization device 110 to report only those physical snapshots 206(1)-206(3) created by the file virtualization device 110, "external" instructs the file virtualization device 110 to report only on physical snapshots 206(1)-206(3) not created by the file virtualization device 110, and "report-prefix" allows the user to set the report prefix. Alternatively, the surveying capability of file virtualization device 110 initiated in response to the request from one or more client computing devices 104(1)-104(n) may be via a graphical user interface icon (GUI) on client computing devices 104(1)-104(n).

Once invoked, the CLI command generates a survey report to a standard reports directory in file virtualization device 110. By way of example only, such surveying command can generate two types of physical snapshot reports. The first type may contain a list of physical snapshots 206(1)-206(3) presented using shares 308(1)-308(n) in given virtual volumes 304(1)-304(n) (also referred to as a "summary" report). The second type of report can contain details of the physical snapshots 206(1)-206(3) and the contents of associated snapshot descriptor files 302(1)-302(n) (also referred to as a "detailed" report). By way of example only, a sample survey report of the first type ("summary report") is shown in Table 3 below.

TABLE 3

Example summary survey report

** Snapshot Survey: Started at Tue Jul 22 23:11:38 2008 **
**** Software Version: 4.00.000.11096 (Jun 12 2008 16:23:55) [nbuilds]
**** Hardware Platform: ARX-4000
Namespace: ns1
Volume: /vol1
Share: S1
   File Server: filer1 (10.90.1.1)
   File Server Share: fs_share1
   Snapshot: nightly.1
   Snapshot: nightly.2
   Snapshot: acopia_4_200807291700_4ba36c10-30c6-11dd-ba58-b9262f5c441e
Share: S2
   File Server: filer2 (10.90.1.2)
   File Server Share: fs_share2
   Snapshot: nightly.3

In step 410, each of descriptor files 302(1)-302(n) found corresponding to physical snapshots 206(1)-206(3) is read and parsed to form a snapshot manage command script file. If a particular descriptor file corresponding to a particular physical snapshot is not found, then that physical snapshot is skipped during searching. In this example, the snapshot manage command is executed to form a snapshot manage script file. When executed by the file virtualization device 110, based upon information/data stored in snapshot descriptor files 302(1)-302(n) on physical snapshots 206(1)-206(3), the file virtualization device via snapshot manage command automatically imports the physical snapshots 206(1)-206(3). The target of the import operation may be either a namespace/volume/rule of the same name or of different names. All shares 308(1)-308(n) of the target are searched for physical snapshots 206(1)-206(3), and each snapshot is searched for a snapshot descriptor file (e.g., descriptor file 302(1)). By way of example only, the snapshot manage command can have a format or syntax shown below, although other formats may be used, as will be apparent to one of ordinary skill in the art, after reading this disclosure:
SHIPYARD# snapshot manage <namespace><volume><share><snapshot rule><snapshot-name> created-on <date/time>[report-prefix <prefix>][verbose]
where <namespace> is the namespace context for the snapshot rule in one or more rule engines 306(1)-306(n), <volume> is one of volumes 304(1)-304(n) in <namespace> containing the snapshot rule, <snapshot rule> is the name of the snapshot rule in <namespace> and <volume> where the snapshot is managed, and is the object managing the physical snapshot requested, <snapshot-name> is the name of the physical snapshot on a particular server in servers 102(1)-102(n).

According to one example, the snapshot manage command can be used when a plurality of shares, e.g., shares 308(2) and 308(3), exist in the target volume 304(2). When the snapshot manage command is executed, the user specified share for the specified physical snapshot is searched. In this example, the "created-on" parameter inputs a date/time in the format of <mm/dd/yyyy:hh:mm>, for example. This "created-on" parameter determines the virtual snapshot instance that the requested physical snapshot will be part of. The same date/time can be used between invocations of the "snapshot manage" command to ensure that multiple physical snapshots 206(1)-206(3) are managed into the same virtual snapshot 200. Alternatively, the snapshot manage command script file of file virtualization device 110 may be executed via a graphical user interface icon (GUI) on client computing devices 104(1)-104(n). Based on the results of executing the snapshot manage command, a report can be generated for errors, status of execution of the snapshot manage command in terms of a "success" or a "failed" identifier. Further, file virtualization device 110 is configured to execute a plurality of snapshot manage command script files for reading and parsing descriptor files 302(1)-302(n) and verifying whether physical snapshots 206(1)-206(3) exist on shares 308(1)-308(n) as parts of volumes 304(1)-304(n) on servers 102(1)-102(n).

When a matching physical snapshot (e.g., physical snapshot 206(1)) is found, the configuration table 106 of configuration database 105 is checked to see if there is a matching record in the target rule of one or more rule engines 306(1)-306(n). If a record in the configuration table 106 for this physical snapshot (and target rule) does not exist, it is created based on the command-line options. If the physical snapshot already exists in the configuration table 106, the snapshot command script file executes successfully.

In step 412, file virtualization device 110 executes a snapshot reconstitution script file to form a reconstituted virtual snapshot that includes physical snapshots 206(1)-206(3) depending upon information read from descriptor files 302(1)-302(n), and is substantially identical to the original virtual snapshot 200. When the file virtualization device 110 takes a virtual snapshot, e.g., virtual snapshot 200, it initiates multiple physical snapshots 206(1)-206(3), all of which are uniquely associated with one or more snapshot descriptor files 302(1)-302(n). The snapshot descriptor files 302(1)-302(n) provide the configuration state of the file virtualization device 110 that initiated the virtual snapshot 200. For reconstituting virtual snapshot 200 in step 412, file virtualization device 110 executes the snapshot reconstitute command to know which of shares 308(1)-308(n) to search for the supplied physical snapshot name in the request received from user computing devices 104(1)-104(n) in step 402. In one example, the file virtualization device 110 is configured to modify this snapshot reconstitution command to re-group physical snapshots 206(1)-206(3) as they are imported.

Further, file virtualization device 110 may execute snapshot reconstitution script to perform the actual reconstitution of a set of physical snapshots 206(1)-206(3) into the corresponding (or different) snapshot rules in rule engines 306(1)-306(n). In one example, the snapshot reconstitution script contains the "snapshot manage" command per rule, per share, per physical snapshot in system 100. Furthermore, if a physical snapshot has accidentally been reconstituted into a rule, the snapshot reconstitution script can be executed to remove one or more physical snapshots 206(1)-206(3) from the virtual snapshot 200, without removing the one or more physical snapshots 206(1)-206(3) from the servers 102(1)-102(n).

According to one example, the snapshot reconstitution command script includes a plurality of snapshot manage commands that when executed by file virtualization device 110 form a reconstituted virtual snapshot. The snapshot reconstitution command script file targets one or more namespaces, volumes, and/or rules. Further, as and when new configuration objects (e.g., a new physical snapshot, a new server 102(1), or a new volume) is added, the snapshot reconstitution command script file can be updated to reflect the change. In one example, the snapshot reconstitution command script file can be in the Perl programming language, although other proprietary, open source, and or customized programming languages may also be used to create the snapshot reconstitution command script files. An example format of a snapshot reconstitution command is shown below, although other formats and syntax may be used for modifying the snapshot reconstitution command script file, as will be apparent to one of ordinary skill in the art, after reading this disclosure. switch# snapshot reconstitute <ns>[<vol>] [<rule>][origin <origin-ns><origin-vol><origin-rule>][output-script <script-filename>][report-prefix <prefix>][verbose]

where <ns> is a source namespace, which configured on the file virtualization device 110, <vol> is an optional source volume in namespace <ns>, <rule> is a snapshot rule, all virtual snapshots are reconstituted into this rule, "origin" is an optional keyword that instructs the file virtualization device 110 to reconstitute virtual snapshots that were originated by another file virtualization device, <origin-ns> is a name of the origin namespace to match, <origin-vol> is the name of the origin volume in namespace <origin-ns> to match, <origin-rule> is the name of the origin rule in volume <origin-vol> to match, "output-script" is an optional keyword that instructs the file virtualization device 110 to write the output script to a user specified script file for use by client computing devices 104(1)-104(n), <script-filename> is a user specified file name that the script output is written to, "report-prefix" is an optional keyword that instructs the file virtualization device 110 to set a report prefix for all of the generated snapshot manage commands, <report-name> is an optional report file name, "verbose" is an optional keyword that indicates that a detailed output report will be generated when the CLI snapshot reconstitution command script is executed by the file virtualization device. Alternatively, the reconstitution script may be implemented using a graphical user interface (GUI) button on file virtualization device 110's display 144, or on a display of one or more client computing devices 104(1)-104(n). An example output of an executed snapshot reconstitution command script file is shown in Table 4 below based upon an example snapshot reconstitution command "switch# snapshot reconstitute ns1/vol1 daily".

TABLE 4

Example output of snapshot reconstitution command

; Snapshot Reconstitute: Started at Tue Jul 22 23:11:38 2008 ****
; Software Version: 4.00.000.11096 (Jun 12 2008 16:23:55) [nbuilds]
; Hardware Platform: ARX-4000
; Switch: SHIPYARD
; Input: snapshot reconstitute ns1 /vol1 daily
; ns1:/vol1, share: share1
snapshot manage ns1 /vol1 share1 daily
acopia_1_200807291700_4ba36c10-
30c6-11dd-ba58-b9262f5c441e created-on 01/01/2008:03:00

TABLE 4-continued

Example output of snapshot reconstitution command snapshot manage ns1 /vol1 share1 daily
acopia_2_200807301700_4ba36c10-
30c6-11dd-ba58-b9262f5c441e created-on 01/01/2008:04:00
snapshot manage ns1 /vol1 share1 daily
acopia_3_200807311700_4ba36c10-
30c6-11dd-ba58-b9262f5c441e created-on 01/01/2008:05:00
; ns1:/vol1, share: share2
snapshot manage ns1 /vol1 share2 daily
acopia_1_200807291700_4ba36c10-
30c6-11dd-ba58-b9262f5c441e created-on 01/01/2008:03:00
snapshot manage ns1 /vol1 share2 daily
acopia_2_200807301700_4ba36c10-
30c6-11dd-ba58-b9262f5c441e created-on 01/01/2008:04:00
snapshot manage ns1 /vol1 share2 daily
acopia_3_200807311700_4ba36c10-
30c6-11dd-ba58-b9262f5c441e created-on 01/01/2008:05:00

In step 414, based upon the physical snapshot names "acopia_1_200807291700_4ba36c10-30c6-11dd-ba58-b9262f5c441e," "acopia_2_200807301700_4ba36c10-30c6-11dd-ba58-b9262f5c441e," and "acopia_3_200807311700_4ba36c10-30c6-11dd-ba58-b9262f5c441e," corresponding, for example, to physical snapshots 206(1)-206(3), respectively, file virtualization device 110 reconstitutes the virtual snapshot 200 into a reconstituted virtual snapshot and provides the reconstituted virtual snapshot with physical snapshots 206(1)-206(3) included therein to requesting client computing devices 104(1)-104(n).

The examples presented above provide numerous advantages for automatically reconstituting virtual snapshots without manual intervention. By way of example only, various use-case scenarios can trigger requests for reconstituting virtual snapshots from users of client computing devices 104(1)-104(n). Some example use case scenarios are listed below, although one of ordinary skill in the art can contemplate additional scenarios where the examples above may be used, after reading this disclosure.

EXAMPLES

Use-Case Scenarios for Snapshot Reconstitution

1. A system administrator downgrades the file virtualization device 110 software leading to the configuration database 105 structure and schemas to be different from that stored in original virtual snapshot 200, and a complete reconfiguration of file virtualization device 110 is to be performed.

2. File virtualization device 110 configuration database 105 corruption: In some examples, the configuration database 105 can become corrupted. The file virtualization device 110 automatically detects this situation and the customer at client computing devices 104(1)-104(n) performs a complete reconfiguration of the file virtualization device 110. In this exemplary use-case scenario, virtual snapshot 200 can be rebuilt into a reconstituted virtual snapshot since descriptor files 302(1)-302(n) can be used to store information for each of physical snapshots 206(1)-206(3) external to the corrupted configuration database 105.

3. Accidental removal of a snapshot rule: If a snapshot rule in rule engines 306(1)-306(n) is accidentally removed and the customer wishes to reconfigure the rule, they can re-associate the physical snapshots 206(1)-206(3) to the new rule using the steps of flowchart 400.

4. Reconfiguration of a managed volume's Virtual Processing Unit (VPU) assignment on the same file virtualization device 110: When changing the VPU assignment, the entire volume configuration must be removed, then re-entered with the new VPU prior to import of physical snapshots 206(1)-206(3).

5. Virtual volume split within same file virtualization device 110 or among different file virtualization devices: For this case, the customer has a single managed volume (comprising several shares 308(1)-308(n)) and desires to split it into multiple managed volumes (e.g., volumes 304(1)-304(n)) each comprising two or more shares.

6. Primary and backup sites—same file virtualization device 110 configurations (i.e., namespace names, volume names, and snapshot rule names are the same): In this case, a customer uses file virtualization device 110 at the primary site where system 100 is located and the backup recovery data storage/mirror site 360. File server replication technology is used to mirror data, including physical snapshots, to backup recovery data storage/mirror site 360. Although physical snapshots 206(1)-206(3) are replicated to the backup recovery data storage/mirror site 360 file servers, the backup site file virtualization device cluster cannot "import" the physical snapshots 206(1)-206(3) into the virtual snapshot rules. Therefore, the presentation of these snapshots (created at the primary site of system 100) is lost at the backup recovery data storage/mirror site 360, and this can trigger snapshot reconstitution requests from client computing device 104(1)-104(n), or an administrator of file virtualization device 110.

7. Many primary sites sending data to a single backup site: Some customers may choose to employ a single backup site (e.g., backup recovery data storage/mirror site 360) for many primary sites for cost savings reasons. This may be where the customer decides to use identical names or different names and relies on filer server replication technology to mirror data. In this example use-case scenario, reconstitution of virtual snapshots for each primary site is performed at backup recovery data storage/mirror site 360.

8. Coalescing two or more managed volumes into a single managed volume: This case involves taking multiple managed volumes 304(1)-304(n), removing them, and creating a new managed volume with the aggregate of their shares 308(1)-308(n). As a result, the topology of file systems on servers 102(1)-102(n) is no longer valid and a snapshot reconstitution to incorporate already existing physical snapshots 206(1)-206(3) into new or reconstituted virtual snapshots different from original virtual snapshot 200 is to be performed.

9. Catastrophic failure of file virtualization device 110: This event requires a complete reconfiguration of the file virtualization device 110 from saved running-configuration and global-configuration outputs, and requires reconstitution of virtual snapshots.

10. Failure of one or more servers 102(1)-102(n): This case requires the data stored on the failed one or more servers 102(1)-102(n) (or, e.g., a network attached storage device attached to servers 102(1)-102(n)) to be restored by the customer to the state previous to the failure. The restored state matches the file virtualization device 110's configuration database 105 should match the original virtual state stored in virtual snapshot 200, triggering reconstitution of virtual snapshot 200.

11. Hardware upgrade of file virtualization device 110: This case may be a combination of several aforementioned cases depending on the customer's approach to the upgrade. For example, an upgrade may occur in phases (moving a portion of the configuration from the old file virtualization device 110 to the new) or it may occur all at once with both cases requiring snapshot reconstitution after the upgrade to match the configuration database 105 prior to the upgrade.

Having thus described the basic concepts, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. For example, different non-TCP networks using different types of file virtualization devices may be selected by a system administrator. The order that the measures are implemented may also be altered. These alterations, improvements, and modifications are intended to be suggested hereby, and are within the spirit and scope of the examples. Additionally, the recited order of processing elements or sequences, or the use of numbers, letters, or other designations therefore, is not intended to limit the processes to any order.

What is claimed is:

1. A method for reconstituting a virtual snapshot of files in a file virtualization system, the method comprising:
    forming at a file virtualization device a virtual snapshot comprising a plurality of physical snapshots associated with one or more file storage devices participating in the virtual snapshot;
    receiving a request for performing an operation on one or more physical snapshots in the plurality of physical snapshots;
    providing the one or more physical snapshots in response to the request for performing the operation when the one or more physical snapshots exists in the virtual snapshot; and
    reconstituting the virtual snapshot by including the one or more physical snapshots to form a reconstituted virtual snapshot in response to the request for performing the operation when the one or more physical snapshots do not exist in the virtual snapshot.

2. The method as set forth in claim 1, wherein the reconstituting further comprises:
    searching each of the one or more file storage devices for a respective stored descriptor file associated with each of the plurality of physical snapshots matching the request, wherein the reconstituting is based upon information contained in the descriptor file;
    reading data related to the virtual snapshot in the descriptor file in each of the one or more file storage devices; and
    determining a composition of the reconstituted virtual snapshot based upon the read data in the descriptor file.

3. The method as set forth in claim 2, wherein the descriptor file is written to the one or more file storage devices prior to the forming the virtual snapshot.

4. The method as set forth in claim 2, wherein the forming comprises writing to the descriptor file information related to one or more virtual characteristics of all shares on the one or more file storage devices used in the reconstituting.

5. The method as set forth in claim 2, wherein the searching comprises:
    surveying the plurality of physical snapshots present on a file virtualization device and the one or more file storage devices;
    skipping all physical snapshots in the plurality of physical snapshots that do not have the descriptor file matching the virtual snapshot; and
    generating a report including data related to each of the plurality of physical snapshots for use by the file virtualization device.

6. The method as set forth in claim 2, wherein the reconstituting comprises:
    executing a script comprising data in the descriptor file for associating the one or more physical snapshots with the reconstituted virtual snapshot.

7. The method as set forth in claim 1 further comprising:
    storing one or more states of the virtual snapshot in a configuration database attached to the file virtualization device.

8. The method as set forth in claim 1, wherein each of the plurality of physical snapshots includes a time dependent state of the files in the file virtualization system.

9. A non-transitory computer readable medium having stored thereon instructions for reconstituting a virtual snapshot of files in a file virtualization system comprising machine executable code which when executed by at least one processor, causes the processor to perform steps comprising:
    forming at a file virtualization device a virtual snapshot comprising a plurality of physical snapshots associated with one or more file storage devices participating in the virtual snapshot;
    receiving a request for performing an operation on one or more physical snapshots in the plurality of physical snapshots;
    providing the one or more physical snapshots in response to the request for performing the operation when the one or more physical snapshots exists in the virtual snapshot; and
    reconstituting the virtual snapshot by including the one or more physical snapshots to form a reconstituted virtual snapshot in response to the request for performing the operation when the one or more physical snapshots do not exist in the virtual snapshot.

10. The medium as set forth in claim 9, wherein the reconstituting further comprises:
    searching each of the one or more file storage devices for a respective stored descriptor file associated with each of the plurality of physical snapshots matching the request, wherein the reconstituting is based upon information contained in the descriptor file;
    reading data related to the virtual snapshot in the descriptor file in each of the one or more file storage devices; and
    determining a composition of the reconstituted virtual snapshot based upon the read data in the descriptor file.

11. The medium as set forth in claim 10, wherein the descriptor file is written to the one or more file storage devices prior to the forming the virtual snapshot.

12. The medium as set forth in claim 10, wherein the forming comprises writing to the descriptor file information related to one or more virtual characteristics of all shares on the one or more file storage devices used in the reconstituting.

13. The medium as set forth in claim 10, wherein the searching comprises:
    surveying the plurality of physical snapshots present on a file virtualization device and the one or more file storage devices;
    skipping all physical snapshots in the plurality of physical snapshots that do not have the descriptor file matching the virtual snapshot; and
    generating a report including data related to each of the plurality of physical snapshots for use by the file virtualization device.

14. The medium as set forth in claim 10, wherein the reconstituting comprises:
    executing a script comprising data in the descriptor file for associating the one or more physical snapshots with the reconstituted virtual snapshot.

15. The medium as set forth in claim 9, wherein the processor further performs steps comprising:

storing one or more states of the virtual snapshot in a configuration database attached to the file virtualization device.

16. The medium as set forth in claim 9, wherein each of the plurality of physical snapshots includes a time dependent state of the files in the file virtualization system.

17. A file virtualization device comprising:
one or more processors; and
a memory coupled to the one or more processors by a bus, at least one of the one or more processors configured to execute programmed instructions for reconstituting a virtual snapshot of files in a file virtualization system stored in the memory with logic configured to implement:
forming at a file virtualization device a virtual snapshot comprising a plurality of physical snapshots associated with one or more file storage devices participating in the virtual snapshot;
receiving a request for performing an operation on one or more physical snapshots in the plurality of physical snapshots;
providing the one or more physical snapshots in response to the request for performing the operation when the one or more physical snapshots exists in the virtual snapshot; and
reconstituting the virtual snapshot by including the one or more physical snapshots to form a reconstituted virtual snapshot in response to the request for performing the operation when the one or more physical snapshots do not exist in the virtual snapshot.

18. The file virtualization device as set forth in claim 17, wherein the reconstituting further comprises:
searching each of the one or more file storage devices for a respective stored descriptor file associated with each of the plurality of physical snapshots matching the request, wherein the reconstituting is based upon information contained in the descriptor file;
reading data related to the virtual snapshot in the descriptor file in each of the one or more file storage devices; and
determining a composition of the reconstituted virtual snapshot based upon the read data in the descriptor file.

19. The file virtualization device as set forth in claim 18, wherein the descriptor file is written to the one or more file storage devices prior to the forming the virtual snapshot.

20. The file virtualization device as set forth in claim 18, wherein the forming comprises writing to the descriptor file information related to one or more virtual characteristics of all shares on the one or more file storage devices used in the reconstituting.

21. The file virtualization device as set forth in claim 18, wherein the searching comprises:
surveying the plurality of physical snapshots present on a file virtualization device and the one or more file storage devices;
skipping all physical snapshots in the plurality of physical snapshots that do not have the descriptor file matching the virtual snapshot; and
generating a report including data related to each of the plurality of physical snapshots for use by the file virtualization device.

22. The file virtualization device as set forth in claim 18, wherein the reconstituting comprises:
executing a script comprising data in the descriptor file for associating the one or more physical snapshots with the reconstituted virtual snapshot.

23. The file virtualization device as set forth in claim 17, wherein the at least one of the or more processors is further configured to implement:
storing one or more states of the virtual snapshot in a configuration database attached to the file virtualization device.

24. The file virtualization device as set forth in claim 17, wherein each of the plurality of physical snapshots includes a time dependent state of the files in the file virtualization system.

* * * * *